(12) United States Patent
Hashimoto et al.

(10) Patent No.: US 6,283,865 B1
(45) Date of Patent: Sep. 4, 2001

(54) DAMPER DISK ASSEMBLY

(75) Inventors: Hideki Hashimoto; Shigetomo Ohshitamoto, both of Katano; Takashi Harada, Shijonawate, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/391,419

(22) Filed: Sep. 8, 1999

(30) Foreign Application Priority Data

Sep. 18, 1998 (JP) .................................................. 10-264921

(51) Int. Cl.$^7$ ....................................................... F16D 3/12
(52) U.S. Cl. ......................................... 464/68; 192/213.22
(58) Field of Search ................................. 464/68, 66, 67, 464/64, 63; 192/213.21, 213.2, 213.22, 213.1, 213.11, 213.12, 70.17

(56) References Cited

U.S. PATENT DOCUMENTS

| 4,560,054 | 12/1985 | Kayanoki et al. . | |
|---|---|---|---|
| 4,577,742 | 3/1986 | Saida . | |
| 4,585,428 | 4/1986 | Asada . | |
| 4,586,595 | 5/1986 | Hartig et al. . | |
| 4,591,348 | * 5/1986 | Takeuchi et al. | 464/64 |
| 4,643,288 | 2/1987 | Tomm et al. . | |
| 4,669,595 | 6/1987 | Fischer et al. . | |
| 4,684,007 | 8/1987 | Maucher . | |
| 4,852,711 | * 8/1989 | Kitano et al. | 192/107 C |
| 4,892,008 | * 1/1990 | Naudin et al. | 464/68 |
| 4,966,269 | 10/1990 | Raab et al. . | |
| 4,998,608 | 3/1991 | Raab et al. . | |
| 5,000,304 | * 3/1991 | Kock et al. | 464/68 |
| 5,238,096 | 8/1993 | Ament et al. . | |
| 5,246,398 | 9/1993 | Birk et al. . | |
| 5,609,526 | * 3/1997 | Kitayama et al. | 464/68 |
| 5,813,915 | * 9/1998 | Imanaka | 464/68 |
| 5,816,925 | * 10/1998 | Mizukami | 464/68 |
| 5,893,446 | 4/1999 | Honjo et al. . | |

FOREIGN PATENT DOCUMENTS

| 32 28 515 A1 | 2/1984 | (DE) . |
|---|---|---|
| 36 38 938 A1 | 5/1987 | (DE) . |
| 32 40 238 C2 | 6/1987 | (DE) . |
| 40 40 606 A1 | 6/1991 | (DE) . |
| 197 17 800 A1 | 1/1998 | (DE) . |

* cited by examiner

Primary Examiner—Lynne H. Browne
Assistant Examiner—Kenn Thompson
(74) Attorney, Agent, or Firm—Shinjyu Global IP Counselors, LLP

(57) ABSTRACT

A clutch or damper disk assembly 1 is provided with a dampening mechanism 4 that relieves rising of a hysteresis torque, and thereby suppresses generation of noises and vibrations in a dampening mechanism having multi-stage characteristics. The clutch or damper disk assembly 1 includes an input rotary member 2, a hub 3 and a dampening mechanism 4. The dampening mechanism 4 is disposed between the input rotary member 2 and the hub 3 for transmitting a torque therebetween and dampening torsional vibrations. In the four stage embodiment, the dampening mechanism 4 includes a set of springs 21 (first stage), a set of springs 206 (second stage), a set of springs 16 (third stage), a set of springs 17 (fourth stage) and a pair of friction mechanisms 241 and 242. The springs 206 are disposed so as to operate in series with the springs 21. The springs 206 have a higher rigidity than the springs 21. The springs 16 are disposed so as to operate in series with respect to the springs 206. The friction mechanisms 241 and 242 are disposed so as to operate in series. The friction mechanism 241 is disposed to operate in parallel with springs 206. The friction mechanism 242 is disposed so as to operate in parallel with the springs 16. The torque generated by the springs 206 can be larger than a sum of the initial torque of the springs 16 and the hysteresis torque of the friction mechanism 242.

40 Claims, 31 Drawing Sheets

DAMPER DISK ASSEMBLY

BACKGROUND OF THE INVENTION

1. Field of the Invention

This invention generally relates to a damper disk assembly. More specifically, the present invention relates to a damper disk assembly with a dampening mechanism having multiple stages, at least three stages of torsion characteristics.

2. Background Information

A clutch disk assembly used for a clutch of a car has a clutch function of engaging and/or disengaging a flywheel of an engine to a transmission shaft, and a dampening function of absorbing and dampening torsion vibrations transmitted from the flywheel. The clutch disk assembly basically includes a clutch engagement portion, a pair of input plates, a hub and an elastic portion. The pair of input plates is fixedly coupled to the clutch disk. The hub is disposed on an inner circumferential side of the input plate. The elastic portion elastically couples the hub and the input plates together for movement in a rotary or circular direction. Hereinafter, a dampening mechanism includes a pair of input plates, a hub, and an elastic portion.

When the clutch engagement portion is coupled with the flywheel, a torque is inputted to the clutch disk assembly from the flywheel. The torque is transmitted to the hub via the elastic portion, and then is outputted to the shaft extending from the transmission. When a torque fluctuation is input to the clutch disk assembly from the engine, a relative rotation is caused between the pair of input plates and the hub, and the elastic portion is compressed repeatedly in a rotating direction. In addition, the clutch disk assembly typically includes a friction mechanism. The friction mechanism is disposed between the input plates and the hub, and generates a friction resistance when the input plates rotate relatively with respect to the hub. The friction mechanism includes basically a plurality of washers and urging members.

In some conventional clutch disk assemblies, the torsion characteristics are configured to provide four stages for reducing noises and vibrations. The first stage provides a low rigidity, the second stage provides an intermediate rigidity, and third and fourth stages provide high rigidities. For providing the four stages, four kinds elastic members are disposed such that these are successively compressed in accordance with increase in a torsion angle. More specifically, the elastic members for the second, third and fourth stages are disposed in windows formed in a flange of a hub, and are configured to operate in parallel with each other between paired plates.

The friction mechanism is formed of, e.g., a first friction mechanism generating a low hysteresis torque in the first stage and a second friction mechanism which does not operate in the first stage, and generates a high hysteresis torque in the second, third and fourth stages.

According to the above structure, a magnitude of the hysteresis torque rapidly changes in addition to change in rigidity, for example, when the second stage starts (i.e., at a boundary between the first and second stages).

Minute vibrations during idling primarily act in the positive and negative first stages, and are absorbed by characteristics of a low rigidity and a low hysteresis torque. However, the vibrations which operate in the range of the positive and negative first stages may expand to the positive and negative second stages, and the vibrations may be rebounded at the positive and negative stage ends by walls of high hysteresis torques, e.g., in the second stages so that further disadvantageous vibrations (jumping phenomenon) may occur.

In view of the above, there exists a need for a dampening mechanism which overcomes the above mentioned problems in the prior art. This invention addresses this need in the prior art as well as other needs, which will become apparent to those skilled in the art from this disclosure.

SUMMARY OF THE INVENTION

An object of the invention is to provide a damper disk assembly with a dampening mechanism providing multiple stages in torsion characteristics, and particularly a mechanism in which rapid rising of a hysteresis torque is suppressed, and thereby noises and vibrations are suppressed.

A damper disk assembly according to the present invention includes a first rotary member, a second rotary member, and a dampening mechanism. The second rotary member is disposed relatively rotatably with respect to the first rotary member. The dampening mechanism is disposed between the first and second rotary members for transmitting a torque therebetween, and dampening torsional vibrations. The dampening mechanism includes a first elastic member, a second elastic member, a third elastic member, and a friction mechanism. The first elastic member is adapted to be compressed in a first stage of torsion characteristics. The second elastic member is adapted to be compressed only in a second stage of the torsion characteristics for providing a higher rigidity than that in the first stage. The third elastic member is disposed so as to operate in series with respect to the second elastic member. The friction mechanism is disposed so as to operate in parallel with respect to the third elastic member. A torque generated by the second elastic member is adapted to exceed a sum of an initial torque of the third elastic member and a hysteresis torque of the friction mechanism.

In the damper disk assembly of the present invention, mentioned above, when a torque is inputted to the first rotary member, for instance, the torque is transmitted to the second rotary member via the dampening mechanism. When the first and second rotary members rotate relatively to one another due to torsional vibrations, the first, second, and third elastic members in the dampening mechanism are compressed in a rotating direction, and a slip occurs in the friction mechanism. While the torsional angle is within the first stage of torsional characteristics, the first elastic member is compressed. While the torsional angle is within the second stage of torsional characteristics, the second elastic member is compressed, providing a higher rigidity than in the first stage. As the second elastic member is compressed in the second stage, the torque generated by the second elastic member exceeds a sum of an initial torque of the third elastic member and a hysteresis torque of the friction mechanism, whereby the third elastic member operates in series in the rotating direction with respect to the second elastic member, and a slip occurs in the friction mechanism. In other words, a slip occurs in the friction mechanism while the torsional angle is within the second stage, generating a higher hysteresis torque. Therefore, a hysteresis torque does not increase suddenly, allowing an efficient absorption of vibrations.

In accordance with another aspect of the present invention, the dampening mechanism of the damper disk assembly as discussed above, further comprising an intermediate member. The intermediate member is disposed so as to transmit a torque between the second and third elastic members. The first and second elastic members are disposed so as to transmit the torque between the first rotary member and the intermediate member. The third elastic member is disposed so as to transmit the torque between the intermediate member and the second rotary member. The first rotary member and the intermediate member form a stop mechanism having a predetermined space in a circumferential direction.

In the damper disk assembly of the present invention, mentioned above, once the first elastic member and the intermediate member contact each other, the second elastic member stops being compressed, and only the third elastic member keeps being compressed. The dampening mechanism generates a larger friction than the case where the second elastic member keeps being compressed by the friction mechanism.

In accordance with another aspect of the present invention, the damper disk assembly includes a first rotary member, a second rotary member, and a dampening mechanism. The second rotary member is disposed relatively rotatably with respect to the first rotary member. The dampening mechanism is disposed between the first and second rotary members for transmitting a torque therebetween and dampening torsional vibrations. The dampening mechanism includes a first intermediate member, a first elastic member, a second intermediate member, a second elastic member, a third elastic member, and a friction mechanism. The first intermediate member is disposed close to the first rotary member between the first and second rotary members. The first elastic member elastically couples the first intermediate member and the first rotary member together in a rotating direction, and is adapted to be compressed in a first stage of torsion characteristics. The second intermediate member is disposed close to the second rotary member between the first and second rotary members. The second elastic member elastically couples the first and second intermediate members together in the rotating direction for providing a higher rigidity than the first elastic member, and is adapted to be compressed only in a second stage of the torsion characteristics. The third elastic member elastically couples the second intermediate member and the second rotary member together in the rotating direction. The friction mechanism generating a friction when the second intermediate member and the second rotary member rotate relatively to each other. A torque generated by the second elastic member is adapted to exceed a sum of an initial torque of the third elastic member and a hysteresis torque of the friction mechanism.

In the damper disk assembly of the present invention, when a torque is inputted to the first rotary member, for instance, the torque is transmitted to the second rotary member via the dampening mechanism. When the first and second rotary members rotate relatively to one another due to torsional vibrations, the first, second, and third elastic members in the dampening mechanism are compressed in a rotating direction, and a slip occurs in the friction mechanism. While the torsional angle is within the first stage of torsional characteristics, the first elastic member is compressed. While the torsional angle is within the second stage of torsional characteristics, the second elastic member is compressed, providing a higher rigidity than the in first stage. As the second elastic member is compressed in the second stage, the torque generated by the second elastic member exceeds a sum of an initial torque of the third elastic member and a hysteresis torque of the friction mechanism, whereby the third elastic member operates in series in the rotating direction with respect to the second elastic member, and a slip occurs in the friction mechanism. In other words, a slip occurs in the friction mechanism while the torsional angle is within the second stage, generating a higher hysteresis torque. Therefore, a hysteresis torque does not increase suddenly, allowing an efficient absorption of vibrations.

In accordance with another aspect of the present invention, the dampening mechanism of the damper disk assembly, as discussed above, has the first rotary member and the second intermediate member forming a stop mechanism with a predetermined space in a circumferential direction.

In the damper disk assembly of the present invention, mentioned above, once the first elastic member and the intermediate member contact each other, the second elastic member stops being compressed, and only the third elastic member keeps being compressed. The dampening mechanism generates a larger friction than the case where the second elastic member keeps being compressed by the friction mechanism.

In accordance with another aspect of the present invention, the dampening mechanism of the damper disk assembly as discussed above, has the second intermediate member and the second rotary member forming the friction mechanism.

In accordance with another aspect of the present invention, the dampening mechanism of the damper disk assembly, as discussed above, has the third elastic member provided with a higher rigidity than the second elastic member.

In the damper disk assembly of the present invention, mentioned above, when the second elastic member stops being compressed, the third elastic member starts providing a higher rigidity than the case where only the second elastic member is compressed.

In accordance with another aspect of the present invention, the dampening mechanism of the damper disk assembly, as discussed above, further comprises a fourth elastic member disposed so as to operate in parallel with respect to the third elastic member, and configured not to operate in a range not exceeding a predetermined torsion angle.

In the damper disk assembly of the present invention, mentioned above, the fourth elastic member starts being compressed while only the third elastic member is compressed, whereby the dampening mechanism provides a higher rigidity than the case where only the third elastic member is compressed.

In accordance with another aspect of the present invention, the dampening mechanism of the damper disk assembly, as discussed above, further comprises a second friction mechanism disposed so as to operate in parallel with the second elastic member, and configured to generate a smaller friction than the friction mechanism.

In the damper disk assembly of the present invention, mentioned above, the first elastic member is compressed while the torsional angle is within the first stage of torsional characteristics, and the second elastic member is compressed while the torsional angle is within the second stage of torsional characteristics. At the same time, the second friction mechanism slips, thereby generating a predetermined hysteresis torque. As the second elastic member is compressed in the second stage, the torque generated by the second elastic member exceeds a sum of an initial torque of the third elastic member and a hysteresis torque of the friction member at some point. Thus, the third elastic member operates in series with respect to the second elastic member, and a slip occurs in the friction mechanism. In other words, the second friction mechanism and the friction mechanism slip together in series with respect to each other, thereby generating an intermediate hysteresis torque, which is larger than the smaller of the hysteresis torques generated by the second friction mechanism and the friction mechanism, but smaller than the larger thereof. While the torsional angle is within the third stage of torsional characteristics, only the third elastic member is compressed, and only the friction mechanism slips, thereby generating a high hysteresis torque. Due to the intermediate hysteresis torque, the hysteresis torque does not increase suddenly, allowing efficient absorption and dampening of vibrations.

These and other objects, features, aspects and advantages of the present invention will become readily apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
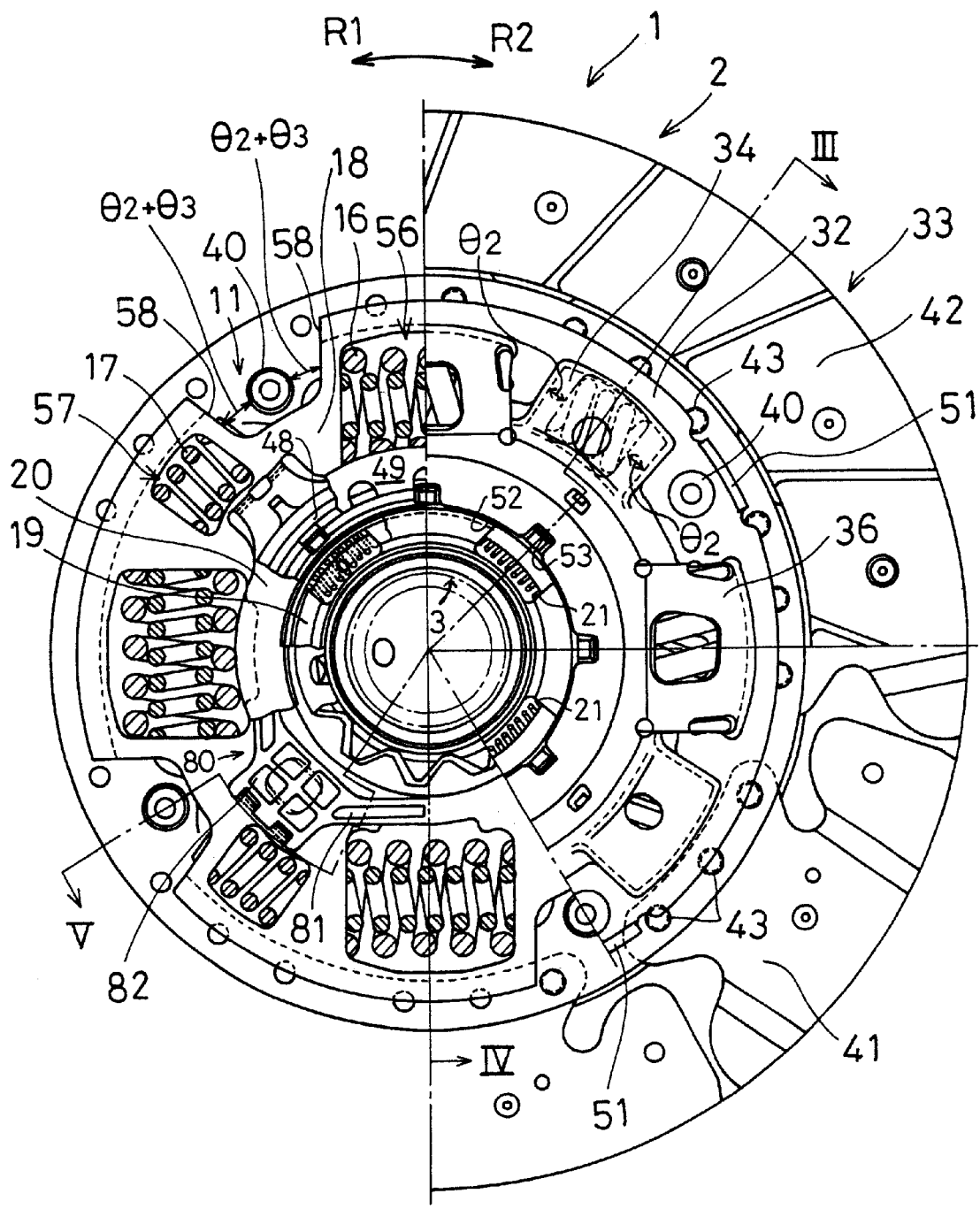
FIG. 1 is a partial side elevational view of a clutch or damper disk assembly in accordance with an embodiment of the present invention with portions broken away for purposes of illustration.
Figure 2:
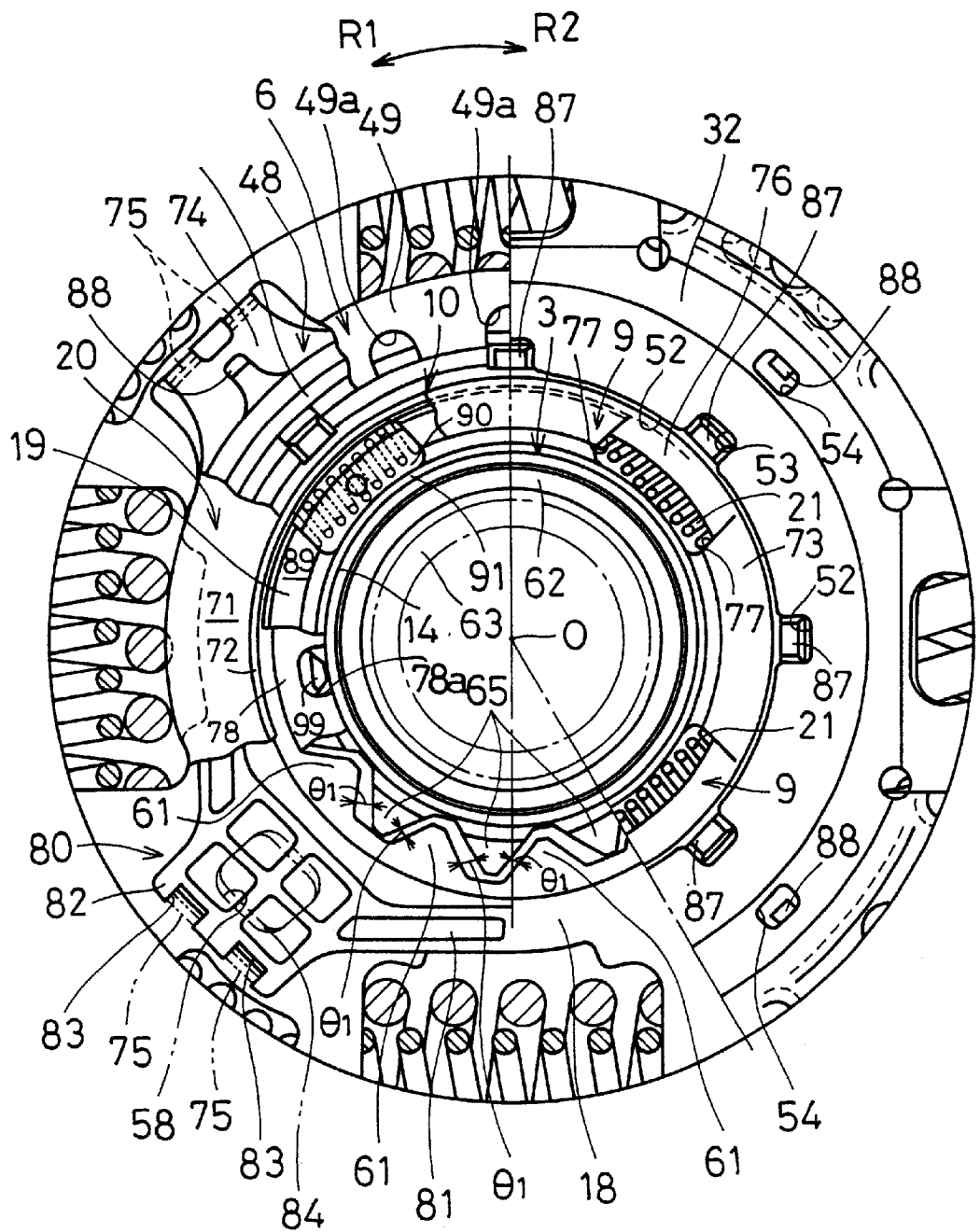
FIG. 2 is an enlarged partial side elevational view of a part of the clutch or damper disk assembly illustrated in FIG. 1 with portions broken away for purposes of illustration.
Figure 3:
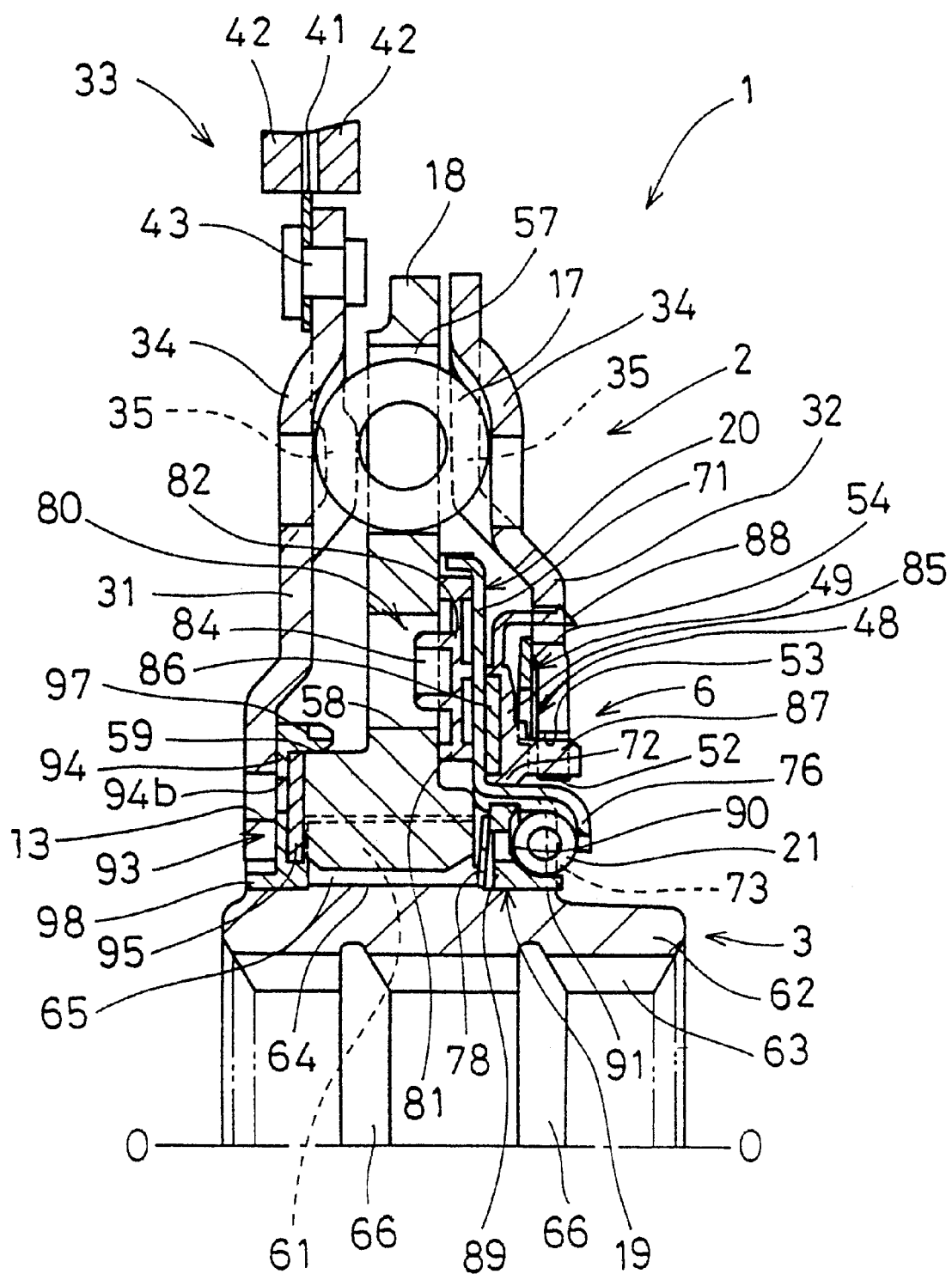
FIG. 3 is an enlarged partial cross sectional view of a part of the clutch or damper disk assembly illustrated in FIG. 1 as viewed along section line O-III of FIG. 1.
Figure 4:
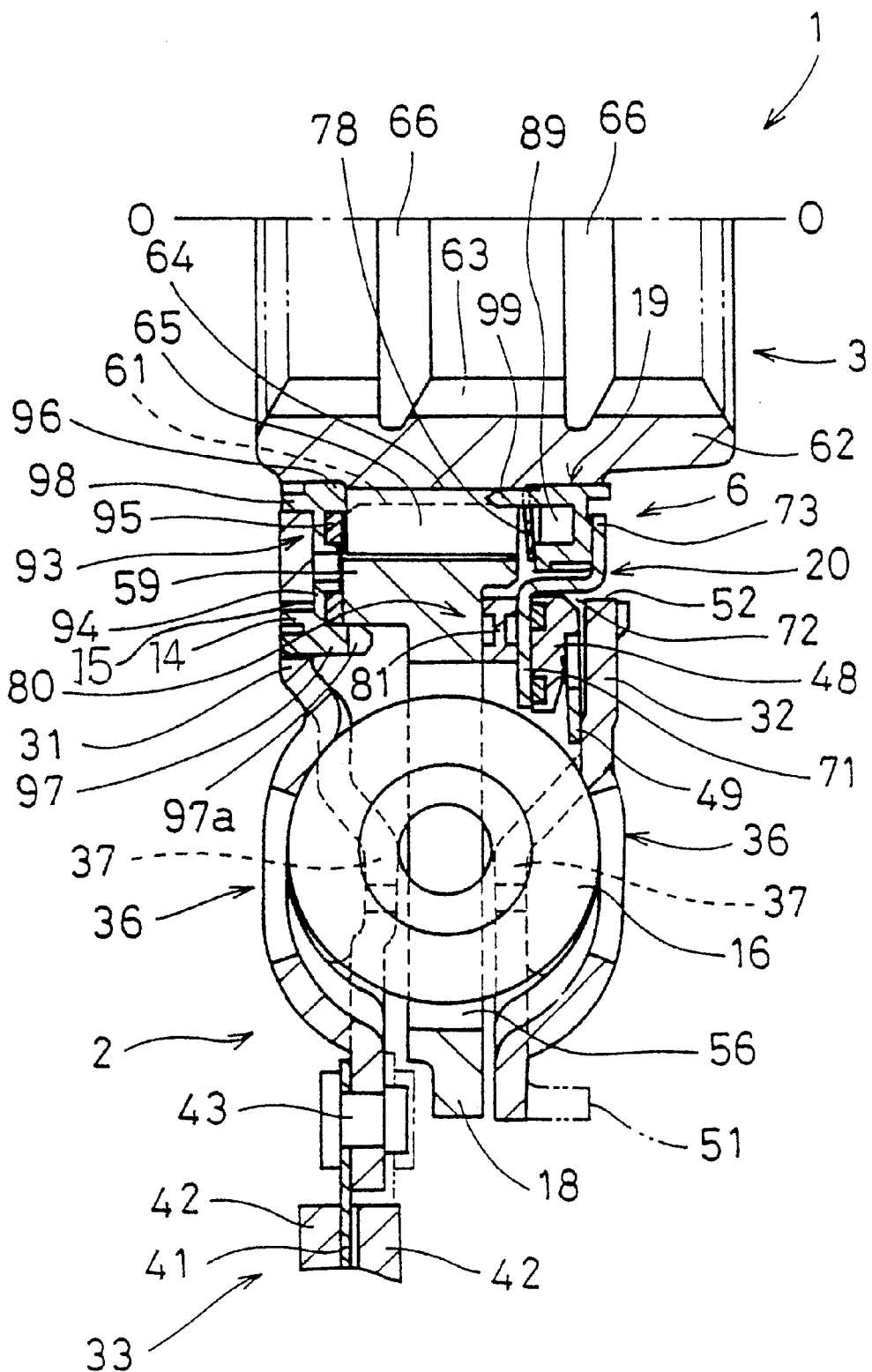
FIG. 4 is an enlarged partial cross sectional view of a part of the clutch or damper disk assembly illustrated in FIG. 1 as viewed along section line O-IV of FIG. 1.
Figure 5:
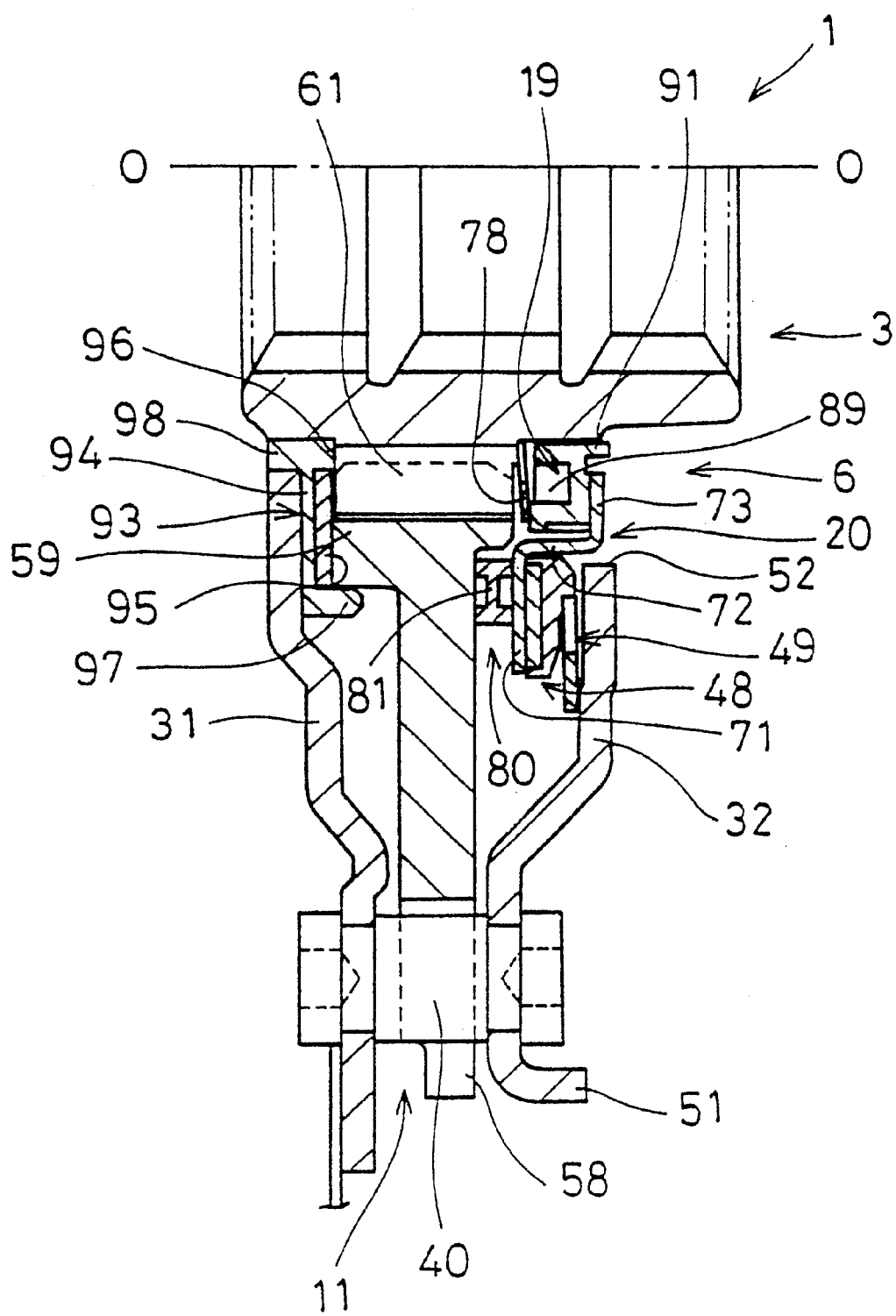
FIG. 5 is an enlarged partial cross sectional view of a part of the clutch or damper disk assembly illustrated in FIG. 1 as viewed along section line O-V of FIG. 1.

Referring initially to FIGS. 1 to 5, a clutch or damper disk assembly 1 is illustrated in accordance with a first embodiment of the present invention. The clutch or damper disk assembly 1 is used for a clutch of a car or other motorized vehicle. On the left side of the clutch or damper disk assembly as viewed in FIGS. 3 to 5, an engine and a flywheel (not shown in Figures) are located, and on the right side as viewed in FIGS. 3 to 5, a transmission (not shown in Figures) is located. Hereinafter, the left side as viewed in Figures 3 to 5 is referred to as a first axial side (engine side), and the right side as viewed in FIGS. 3 to 5 is referred to as a second axial side (transmission side). The centerline O—O in each of the drawings represents an axis of rotation or a center of rotation of the clutch or damper disk assembly 1. As shown in FIGS. 1 and 2, an arrow R1 indicates a first rotational direction (positive direction) of the flywheel and the clutch or damper disk assembly 1, while an arrow R2 indicates its opposite rotational direction (negative direction).

Figure 6:
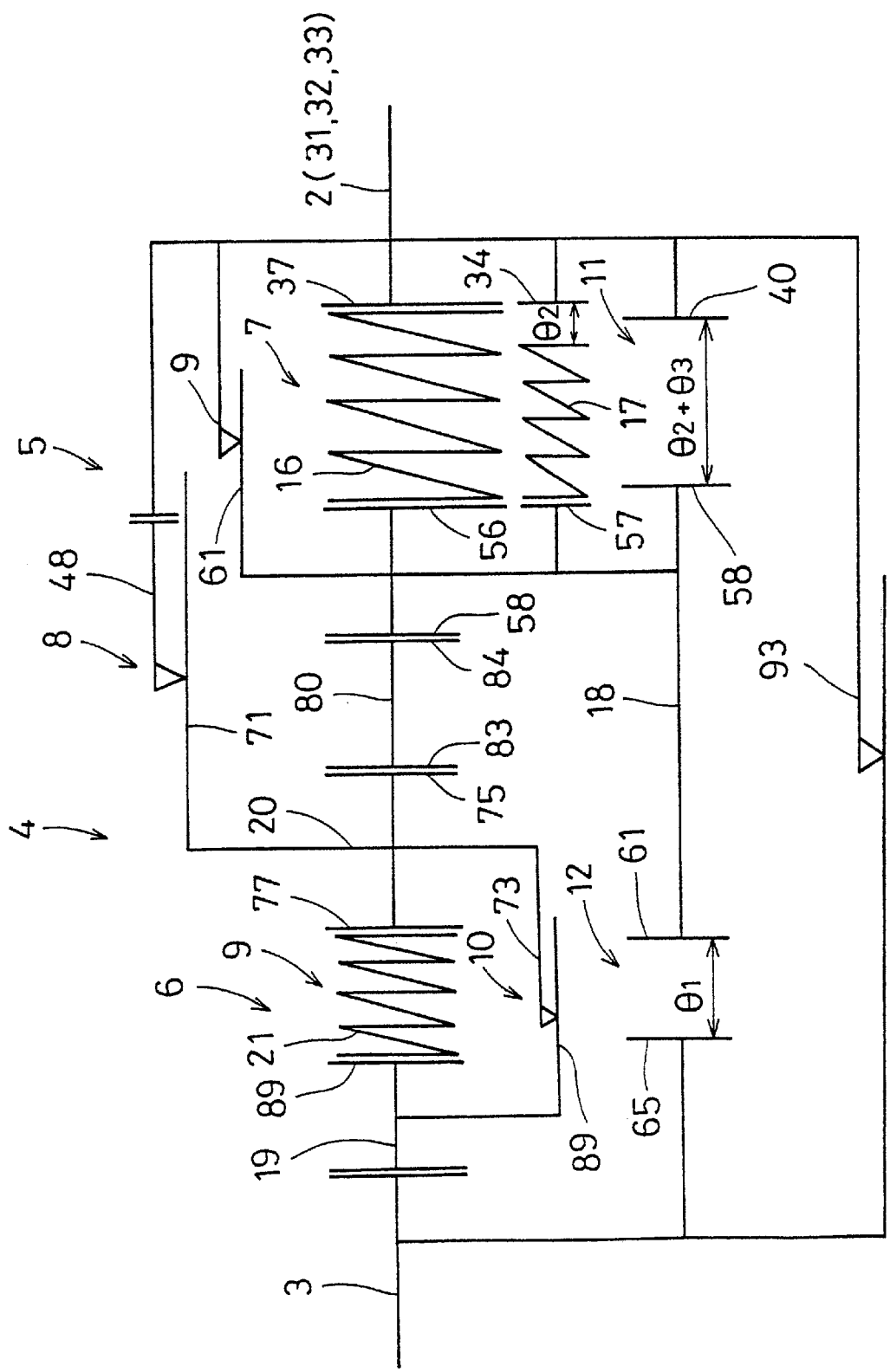
FIG. 6 is a diagrammatic machine circuit drawing of a dampening mechanism utilizing the clutch or damper disk assembly in accordance with the present invention.

A clutch or damper disk assembly 1, as shown in a machine circuit diagram of FIG. 6, mainly includes an input rotary portion 2, a hub or output rotary portion 3, and a dampening mechanism 4 disposed between the input rotary portion 2 and the hub 3. The dampening mechanism 4 includes a first dampening mechanism 5 that functions in a first range of torsion angle, and a second dampening mechanism 6 that functions in a second range of torsion angle. The first dampening mechanism 5 and the second dampening mechanism 6 are disposed between the input rotary portion 2 and the hub 3 so as to operate in series via a hub flange 18 which is an intermediate plate.

Still referring to FIG. 6, the first dampening mechanism 5 basically includes a first elastic mechanism 7, a first friction mechanism 8 and a first stopper 11. The first elastic mechanism 7 has two sets of springs 16 and 17 as seen in FIG. 1. The first friction mechanism 8 generates friction when the hub flange 18 rotates relatively against the input rotary portion 2. The first stopper 11 is a mechanism that controls a relative turning angle between the hub flange 18 and the input rotary portion 2. The first stopper 11 allows the input rotary portion 2 and the hub flange 18 to rotate relatively to each other within a range of a torsion angle of $\theta_2+\theta_3$. The first elastic mechanism 7 (springs 16 and 17), the first friction mechanism 8 and the first stopper 11 are disposed between the hub flange 18 and the input rotary portion 2 so as to operate in parallel.

The second dampening mechanism 6 includes mainly a second elastic mechanism 9, a second friction mechanism 10 and a second stopper 12. The second elastic mechanism 9 is formed of a plurality of second springs 21. Each second spring 21 of the second elastic mechanism 9 has a spring constant, which is set to be smaller than each of the springs 16 of the first elastic mechanism 7. The second friction mechanism 10 is set so as to generate a friction smaller than the friction generated by the first friction mechanism 8. The second stopper 12 is a mechanism to control a relative rotation between the hub 3 and the hub flange 18 and permits the hub 3 and the hub flange 18 to rotate relatively within a range of a torsion angle $\theta_1$. The second elastic mechanism 9, the second friction mechanism 10 and the second stopper 12 are disposed between the hub 3 and the hub flange 18 so as to operate in parallel.

The structure of the clutch or damper disk assembly 1 will now be described in more detail with reference to FIG. 3. The input rotary portion 2 includes a clutch plate 31, a retaining plate 32 and a clutch disk 33. The clutch plate 31 and the retaining plate 32 are disk-shaped members which form annular plate portions that are disposed axially apart from each other by a predetermined distance. The clutch plate 31 is disposed on the first axial side, and the retaining plate 32 is disposed on the second axial side. The outer circumferential parts of the clutch plate 31 and the retaining plate 32 are fixedly coupled to each other by a plurality of stop pins 40 disposed in a circular direction side by side as seen in FIGS. 1 and 5. Consequently, the distance in an axial direction between the clutch plate 31 and the retaining plate 32 is determined by the stop pins 40. The clutch plate 31 and the retaining plate 32 rotate together. A cushioning plate 41 of the clutch disk 33 is fixedly coupled to the outer circumferential part of the clutch plate 31 by a plurality of rivets 43 as seen in FIGS. 1, 3 and 4. An annular friction facing 42 is fixedly coupled to both sides of the cushioning plate 41.

As seen in FIG. 3, several first receptacles 34 are formed in each of the clutch plate 31 and the retaining plate 32 in equal intervals in a circular direction. The first receptacle 34 swells slightly in an axial direction. Each of the first receptacles 34 has first supporting portions 35 on both circular sides thereof. The first supporting portions 35 oppose each other in a circular direction. As seen in FIG. 4, several second receptacles 36 are formed in each of the clutch plate 31 and the retaining plate 32 in equal intervals in a circular direction. The second receptacles 36 are disposed adjacent to the R1 side of each of the first receptacles 34. Each of the second receptacles 36 has a second supporting portion 37 on its both sides in a circular direction. Each second receptacle 36 is longer than the first receptacle 34 in both radial and circular directions as seen in FIG. 1.

As seen in FIGS. 4 and 5, at an outer circumferential edge of the retaining plate 32, a plurality of bent parts 51 that are bent toward the second axis are formed. Each of the bent parts 51 is formed adjacent to the corresponding stop pin 40. The bent parts 51 increase the strength of the circumference of each of the stop pins 40 and the stop pin 40 itself. Therefore, the stop pins 40 can be disposed at the most radially outer sides of the clutch plate 31 and the retaining plate 32, resulting in a high stopping torque. Since the bent parts 51 do not increase the radius of the retaining plate 32, the retaining plate 32 can be smaller in a radial direction in comparison with that of the conventional retaining plate having the same strength. On the other hand, even if the radial length of the retaining plate 32 is the same as that of the conventional retaining plate, the stop pins 40 can be disposed at the more radially outer side of the clutch plate 31 and the retaining plate 32, in comparison with the conventional retaining plate. Since the bent parts 51 are formed partially around the retaining plate 32, the amount of metal plate material needed for the bent parts 51 is not substantial.

As shown in FIGS. 3–5, the hub flange 18 is disposed between the clutch plate 31 and the retaining plate 32, that is, axially between the two plates. The hub flange 18 operates as an intermediate portion between the input rotary portion 2 and the hub 3. The hub flange 18 is a disk-shaped member or annular portion that is thicker than the plates 31 and 32. At the hub flange 18, several first window holes 57 are formed for the corresponding first receptacles 34. The circular angle of each of the first window holes 57 is smaller than the circular angles between the first supporting portions 35 of the first receptacles 34. The centers of a rotary direction of the first window holes 57 coincide approximately with that of the first receptacles 34. Therefore, as seen in FIG. 1, a gap of a torsion angle $\theta_2$ is formed at both sides in a circular direction between the circular ends of the first window holes 57 and the first supporting portions 35 of the first receptacles 34. The springs 17 are installed within the first window holes 57. The springs 17 are coil springs with their circular ends touching the circular ends of the first window holes 57. In this condition, gaps with torsion angles $\theta_2$ exist between both circular ends of the springs 17 and the first supporting parts 35 of the first receptacles 34 as seen in FIG. 1.

As seen in FIG. 4, at the hub flange 18, the second window holes 56 are formed at the locations corresponding to the second receptacles 36. The lengths of the second window holes 56 in radial and circular directions coincide approximately with those of the second receptacles 36. The first springs 16 are disposed within the second window holes 56. The first springs 16 form an elastic portion that includes two kinds of coil springs. The circular ends of first springs 16 touch both of the circular ends of the second window holes 56. In addition, both of the circular ends of the first springs 16 touch the second supporting portions 37 of the second receptacle 36.

As seen in FIGS. 3 and 4, a cylinder-shaped portion 59, which extends in axially both directions, is formed at the inner circumferential part of the hub flange 18. The cylinder-shaped portion 59 has a plurality of internal teeth 61 formed thereon as seen in FIG. 2. These internal teeth 61 extend radially inward from the cylinder-shaped portion 59.

The hub 3 is a cylinder-shaped portion, which is disposed at the inner circumferential side of the plates 31 and 32 as well as at the inner circumferential side of the hub flange 18. In other words, the hub 3 is located at the center of each of these portions. The hub 3 includes mainly a cylinder-shaped boss 62. The hub 3 has a plurality of splines 63 formed at a center hole of the boss 62. Since the splines 63 are connected with the splines of a shaft extending from the transmission, it is possible to output a torque from the hub 3 to the transmission shaft. A flange 64 extends radially outwardly from the boss 62 of the hub 3. In this embodiment, the width of the flange 64 as measured in a radial direction is small. The flange 64 of the hub 3 has a plurality of external teeth 65 extending radially outward therefrom. The external teeth 65 can be thought to form a part of the flange 64 that extends radially outwardly from the boss 62. The external teeth 65 have a radial length corresponding to the cylindershaped portion 59 of the hub flange 18. The external teeth 65 extend to a space between the internal teeth 61, and circular gaps of predetermined torsion angles $\theta_1$ formed between the external teeth 65. The torsion angle $\theta_1$ on the R2 side of the external teeth 65 is set to be slightly larger than the torsion angle $\theta_1$ on the R1 side. The internal teeth 61 or the external teeth 65 become circumferentially narrower towards radial ends thereof.

Since both the internal teeth 61 and the external teeth 65 are formed along the entire periphery, the areas which both the internal teeth 61 and the external teeth 65 touch each other increase. In other words, a cutout to dispose an elastic portion having a low rigidity is not formed, which is not the case with conventional teeth. As a result, contact areas between the internal teeth 61 and the external teeth 65 increase. In other words, since a stress to the contact area decreases, an abrasion of the portions is less likely to occur. Consequently, the present teeth system has a characteristic of a higher torque with a smaller space as compared with that in which a part of the teeth is cutout.

The second dampening mechanism 6 will now be described as follows with particular reference being made to FIGS. 3–5 and 8–11. The second dampening mechanism 6 not only transmits a torque between the hub 3 and the hub flange 18, but also absorbs and dampens torsional vibrations. The second elastic mechanism 9 of the second dampening mechanism 6 comprises second springs 21. The second friction mechanism 10 of the second dampening mechanism 6 includes a bushing 19, a fixing plate 20 and a second cone spring 78. The second dampening mechanism 6 is located in a different axial position from the internal teeth 61 and the external teeth 65, which connect the hub 3 and the hub flange 18. In particular, as seen in FIGS. 3–5, the second dampening mechanism 6 is placed on the transmission side relative to the internal teeth 61 and the external teeth 65. In this way, the sufficient contact areas between the internal teeth 61 and the external teeth 65 can be secured. In addition, since the second dampening mechanism 6 is not disposed between the internal teeth 61 and the external teeth 65, which is not the case with conventional mechanisms, the sufficient margin to connect the second springs 21 can be secured. As a result, since a spring sheet is not necessary for this mechanism, the second springs 21 can be assembled more easily.

The fixing plate 20 operates as an input member of the second dampening mechanism 6. In other words, the fixing plate 20 is a portion to which a torque is inputted from the hub flange 18. The fixing plate 20 is a thin metal plate portion disposed between the inner circumference of the hub flange 18 and the inner circumference of the retaining plate 32. As shown in FIGS. 8 to 11, the fixing plate 20 includes a first disk-shaped portion 71, a cylinder-shaped or tubular portion 72 and a second disk-shaped portion 73. The cylinder-shaped portion 72 extends from the inner circumferential edge of the first disk-shaped portion 71 toward the second axial direction (the transmission side). The second disk-shaped portion 73 extends inwardly from the cylinder-shaped portion 72 in a radial direction.

As seen in FIGS. 2–5, a spacer 80 is disposed between the first disk-shaped portion 71 of the fixing plate 20 and the hub flange 18. The spacer 80 connects the fixing plate 20 with the hub flange 18 in a rotary direction, and receives a force that is applied from the fixing plate 20 to the hub flange 18. The spacer 80 comprises an annular portion 81 and a plurality of protrusions 82 projecting from the annular portion 81 outwardly in a radial direction as seen in FIG. 2. Two cutouts 83 are formed at the outer circumferential edge of each of the protrusions 82. A projection 84 extends from each of the protrusions 82 toward the first axial direction as seen in FIG. 3. Projections 84 are inserted in connecting holes 58, which are formed in the hub flange 18. The projections 84 are connected with the connecting holes 58 so as to be slightly movable in a radial direction and relatively unmovable in a rotary direction.

Figure 8:
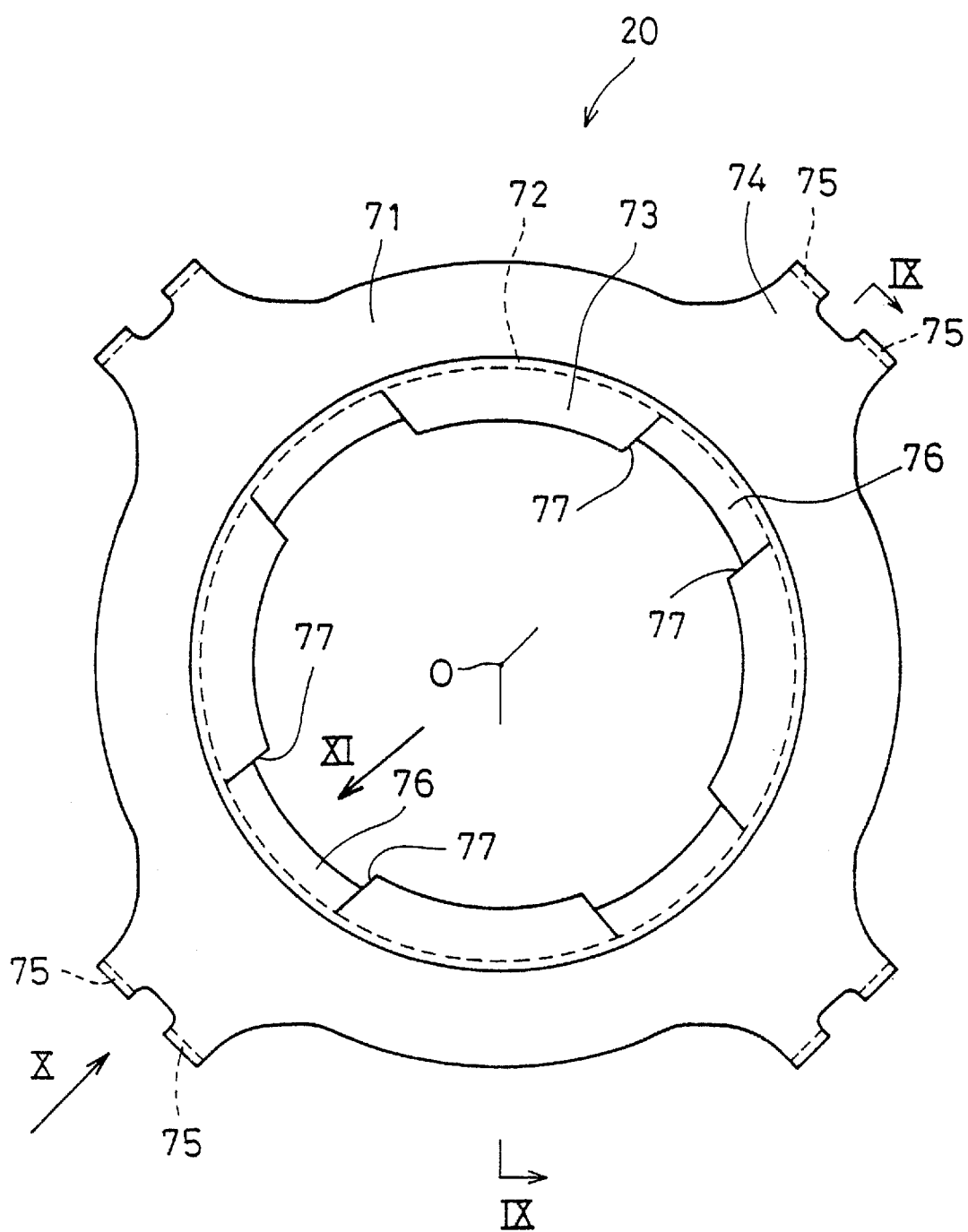
FIG. 8 is a side elevational view of a fixing plate utilized with the clutch or damper disk assembly illustrated in FIG. 1 in accordance with the present invention.
Figure 9:
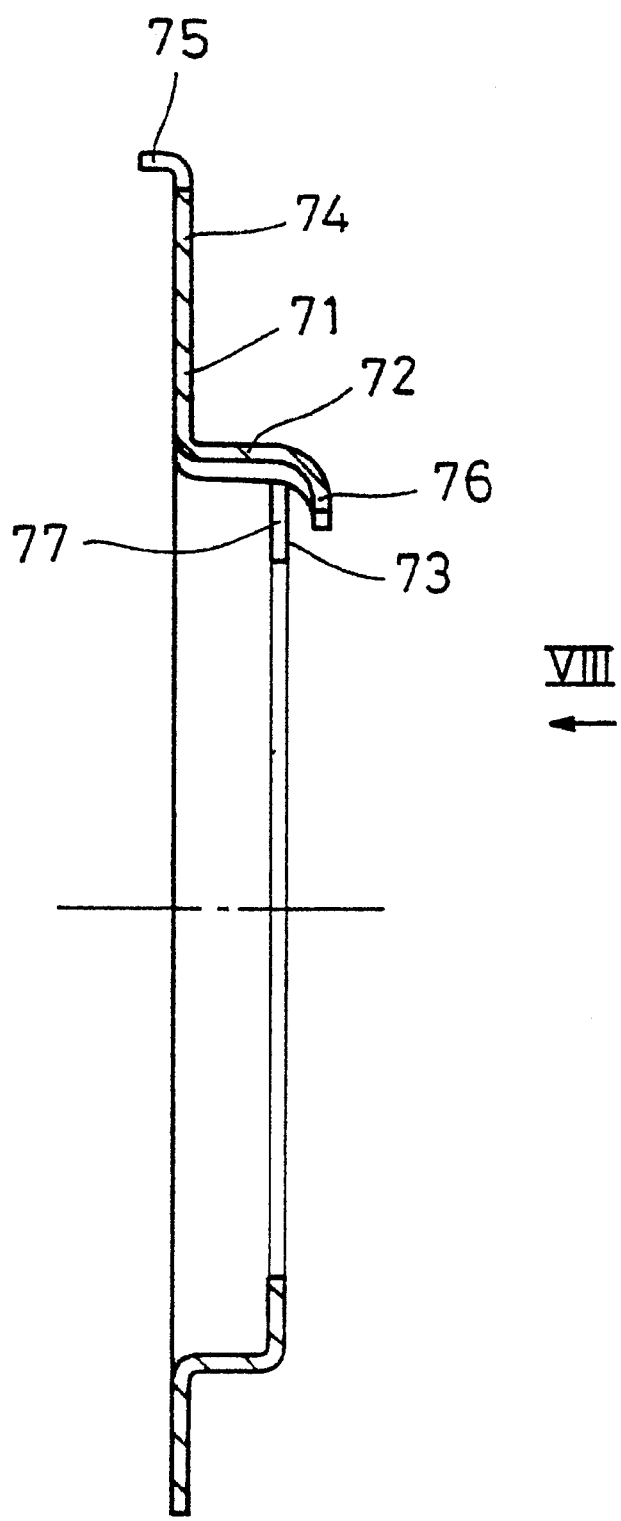
FIG. 9 is a cross sectional view the fixing plate illustrated in FIG. 8 as viewed along section line IX—IX of FIG. 8.
Figure 10:
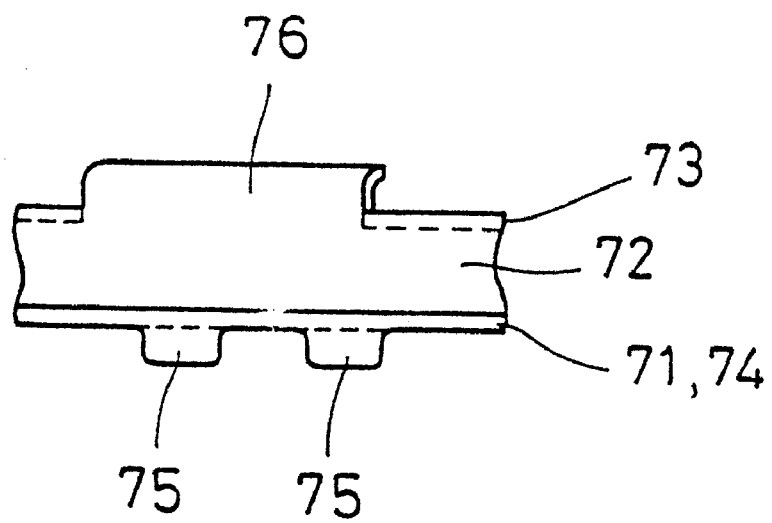
FIG. 10 is a partial edge elevational view of a part of the fixing plate illustrated in FIG. 8 as viewed along an arrow X of FIG. 8.
Figure 11:
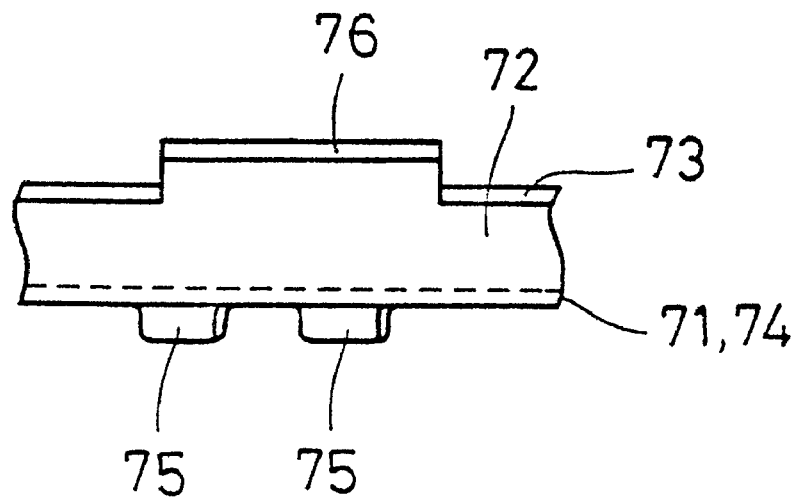
FIG. 11 is a partial edge elevational view of a part of the fixing plate illustrated in FIG. 8 as viewed along an arrow XI of FIG. 8.
Figure 12:
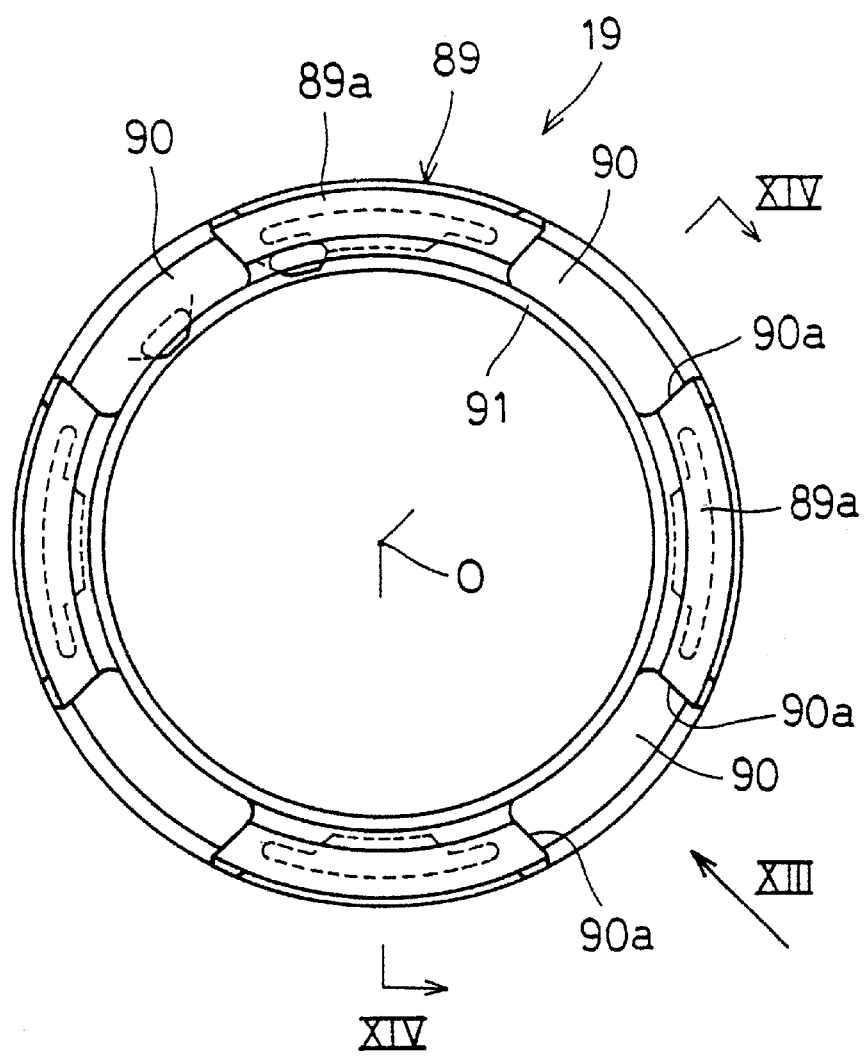
FIG. 12 is a front side elevational view of a bushing utilized with the clutch or damper disk assembly illustrated in FIG. I in accordance with the present invention.
Figure 13:
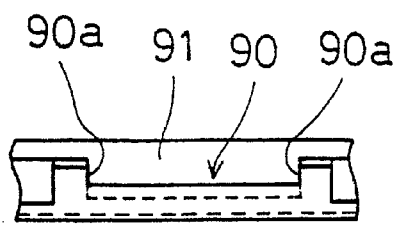
FIG. 13 is a partial edge elevational view of a part of the bushing illustrated in FIG. 12 as viewed along an arrow XIII of FIG. 12.

As seen in FIGS. 2 and 8, the fixing plate 20 has four protrusions 74. Protrusions 74 project outwardly in a radial direction at equal intervals in a circular direction from the first disk-shaped portion 71 of the fixing plate 20. Each of the protrusions 74 is formed corresponding to the protrusions 82 of the spacer 80. Nails or tabs 75 of protrusions 74 are located within the cutouts 83 which are formed at the ends of the protrusions 82 of the spacer 80. In the structure mentioned above, the fixing plate 20 is fixedly connected with the hub flange 18 via the spacer 80 to be relatively unrotatable relative to each other. In other words, the fixing plate 20 is connected to hub flange 18 so that a torque can be transmitted from the hub flange 18 to fixing plate 20. In addition, the hub flange 18 via the spacer 80 supports the first axial side of the fixing plate 20. The fixing plate 20 is movable toward the second direction with respect to the spacer 80 and the hub flange 18.

Referring to FIGS. 1–5, the first friction mechanism 8 that is formed between the fixing plate 20 and the retaining plate 32 will now be described in more detail. The first friction mechanism 8 includes a first friction washer 48 and a first cone spring 49. The first friction washer 48 is connected with the retaining plate 32 so as to be relatively non-rotatable, but axially movable relative to each other, and generates a friction by sliding against the fixing plate 20. The first friction washer 48 comprises mainly an annular-shaped resin portion. The first friction washer 48 includes an annular portion 85 made of a resin, and a friction portion 86.

The friction portion 86 is molded to or bonded to the fixing plate 20 side of the annular portion 85. The friction portion 86 is a portion that is designed to increase a friction coefficient between the first friction washer 48 and the fixing plate 20, and has an annular or disk-like shape. The annular portion 85 has a plurality of rotationally connecting portions 87 extending toward the second axial side. These rotationally connecting portions 87 are formed at the inner circumference of the annular portion 85. The rotationally connecting portions 87 are inserted in a plurality of cutouts 53 which are formed in a center hole 52 (inner circumferential edge) of the retaining plate 32. In this way, the first friction washer 48 is connected with the retaining plate 32 in a relatively non-rotatable, but axially movable manner. In addition, in the annular portion 85, connecting portions 88, which extend outwardly in a radial direction from the outer circumferential edge and then toward the second axial side are formed. The connecting portions 88 are relatively thin and have a tab or detent portion at the end. The connecting portions 88 are inserted in holes 54, which are formed at the retaining plate 32, and its tab or detent portions of connecting portions 88 are connected with the retaining plate 32. The connecting portions 88 urge itself outwardly in a radial direction while connected, and press itself against the holes 54. Therefore, after partial assembling (subassembling), the first friction washer 48 is not removed easily from the retaining plate 32. In this way, in the first friction washer 48, the rotationally connecting portions 87 transmit a torque, whereas the connecting portions 88 connect temporarily a portion of first friction washer 48 with the retaining plate 32. The connecting portions 88 are thin and able to bend. Since the connecting portions 88 have a low rigidity, they hardly brake during subassembling. Therefore, since a force is not applied to the rotationally connecting portions 87 during subassembling, the first friction washer 48 is less likely to be broken than the conventional resin friction washers which have a similar tab or detent portion of to be connected to a retaining plate 32. In addition, since a press fitting machine is not necessary to subassemble the friction washer 48, costs for equipment can be reduced.

The first cone spring 49 is disposed between the first friction washer 48 and the inner circumference of the retaining plate 32. The first cone spring 49 is compressed in an axial direction between the retaining plate 32 and the first friction washer 48. The outer circumferential edge of the first cone spring 49 is supported by the retaining plate 32, while the inner circumferential edge of the first cone spring 49 contacts the annular portion 85 of the first friction washer 48. As seen in FIG. 2, the first cone spring 49 has a plurality of cutouts 49a formed on its inner circumferential side. It can be said that the cutouts 49a at the inner circumferential edge form a plurality of projections on the inner circumferential edge of first cone spring 49. Projection parts that are formed on the outer circumferential side of the rotationally connecting portions 87 of the first friction washer 48 are inserted in the cutouts 49a. In this way, the first cone spring 49 is connected with the first friction washer 48 in a relatively non-rotatable manner.

Referring to FIGS. 8–11, at the second disk-shaped portion 73 of the fixing plate 20, several cut and lift parts 76 are formed at equal intervals in a circular direction. The cut and lift parts 76 are formed by cutting and lifting portions of the inner circumferential end of the second disk-shaped portion 73 in the axial direction. The cut and lift parts 76 are disposed closer to the second axial side compared with other parts of the second disk-shaped portion 73. At a part of the second disk-shaped portion 73 where the cut and lift parts 76 are formed, a cutout part is formed as seen in FIG. 8. A supporting part 77 is formed at both ends of the cutout part in a circular direction.

Figure 14:
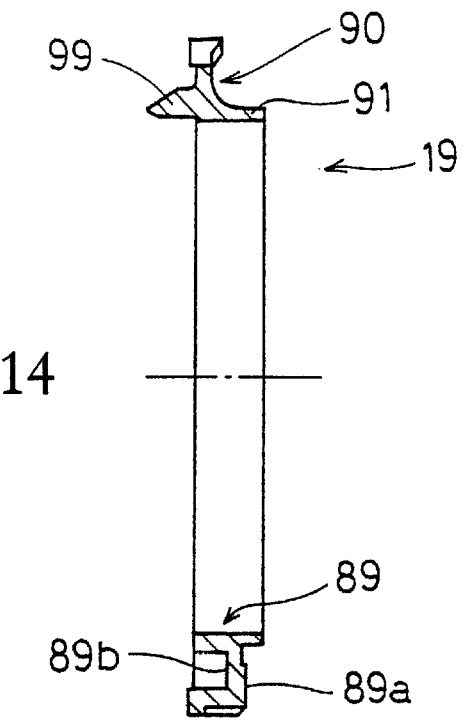
FIG. 14 is a cross sectional view of the bushing illustrated in FIG. 12 as viewed along section line XIV—XIV in FIG. 12.
Figure 15:
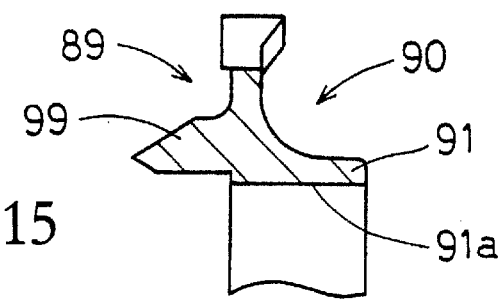
FIG. 15 is an enlarged, partial cross sectional view of a part the bushing illustrated in FIGS. 12–14.

A bushing 19 operates as an output portion in the second dampening mechanism 6. The bushing 19 is connected with the hub 3 in a relatively non-rotatable manner. In particular, the bushing 19 is an annular resin portion, which is disposed on the second axial side of both the internal teeth 61 of the hub flange 18 and the external teeth 65 of the hub 3. The bushing 19 is also located on the inner circumferential side of the cylinder-shaped portion 72 of the fixing plate 20, and in a space on the outer circumferential side of the second axial side part of the boss 62. The bushing 19 includes mainly an annular portion 89 with a plurality of spring receptacles 90, as shown in FIGS. 12 to 19. The spring receptacles 90 are formed at equal intervals in a circular direction at the side face of the second axial side of the annular portion 89. The spring receptacles 90 are formed at locations corresponding to the cut and lift parts 76 or the cutout parts of the fixing plate 20. The spring receptacles 90 are concave parts that are formed at the side face of the bushing 19 on the second axial side. Each of the concave parts, as shown in FIGS. 14 and 15, has a cross section of a part of a circle. In addition, a hole is formed that penetrates in an axial direction in each spring receptacle 90 at its center in both radial and circular directions. At the inner circumference of the annular portion 89, an inner circumferential supporting part 91 is formed with a cylinder like shape. The supporting part 91 extends toward the second axial side from the annular portion 89. An inner circumferential face 91a of the bushing 19 is formed by the inner circumferential supporting part 91. This inner face 91a touches or is close to the outer circumferential face of the boss 62. A side face 89a is formed on the second axial side of the annular portion 89 of the bushing 19. This side face 89a touches the side face of the first axial side of the second disk-shaped portion 73 of the fixing plate 20.

The second friction mechanism 10 is formed between the annular portion 89 of the bushing 19 and the second disk-shaped portion 73 of the fixing plate 20. The second springs 21 are disposed within each of the spring receptacles 90. The second springs 21 are preferably coil springs that are smaller than the first spring 16 or the spring 17. The second spring 21 also has spring constants that are smaller than the first spring 16 or the spring 17. The second springs 21 are disposed within the spring receptacles 90 with the ends of the second springs 21 in a circular direction touching or close to both ends of the spring receptacles 90 in a circular direction. Both the axial inner sides (the first axial side) and the inner circumferential sides of the second springs 21 are supported by the bushing 19 within the spring receptacles 90.

The supporting parts 77 of the fixing plate 20 are connected in a rotary direction with both circular ends of the second springs 21. In this way, a torque is transmitted from the fixing plate 20 to the bushing 19 via the second springs 21. The first axial side of the end face of the second springs 21 in a circular direction is totally supported by the circular end of the spring receptacles 90. In addition, the circular end faces of the second springs 21 are supported by supporting parts 77. Thus, the second spring 21 has a large connecting margin at both circular ends. In other words, the area of the circular ends of the second springs 21 that is supported by he supporting parts 77 is large. This arrangement is made possible by disposing the second springs 21 at a location that is shifted in an axial direction from the conventional location, which is between a hub and hub flange. Consequently, a spring sheet is not necessary, resulting in a fewer number of parts.

The cut and lift parts 76 are disposed so as to support the axial outer side (the second axial sides) of the second springs 21. Thus, the outer circumferential side and the outer axial sides of the second springs 21 are supported by the fixing plate 20.

Figure 16:
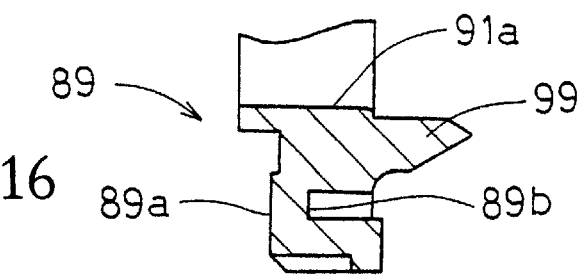
FIG. 16 is an enlarged, partial cross sectional view of a part the bushing illustrated in FIGS. 12–15 as viewed along section line XVI—XVI of FIG. 17.
Figure 17:
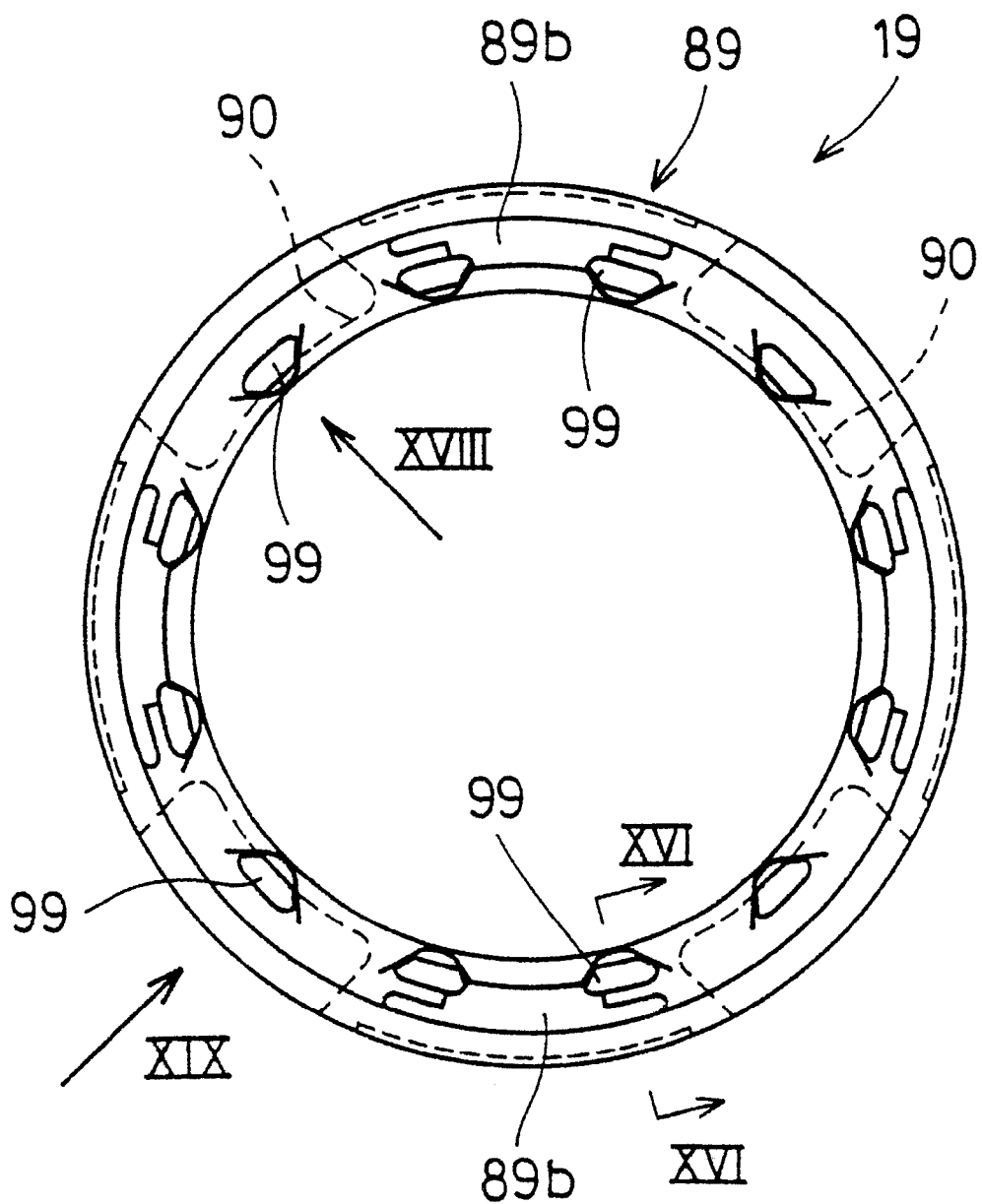
FIG. 17 is a back side elevational view of the bushing illustrated in FIGS. 12–16 for use with the clutch or damper disk assembly illustrated in FIG. 1 in accordance with the present invention.
Figure 18:
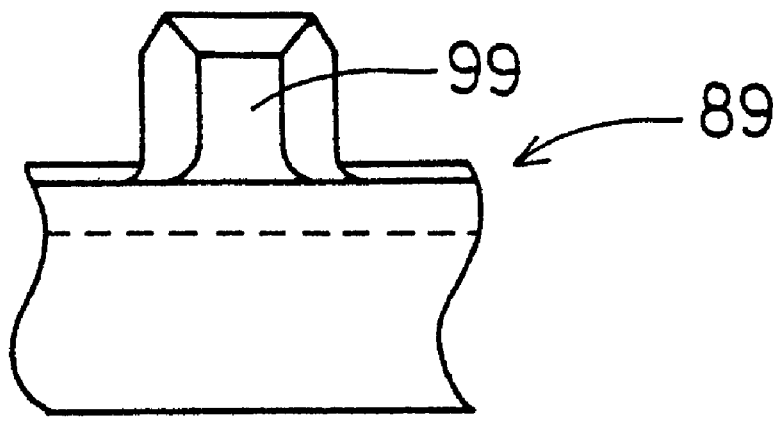
FIG. 18 is an enlarged, partial cross sectional view of a part the bushing illustrated in FIGS. 12–17 as viewed along an arrow XVIII of FIG. 17.
Figure 19:
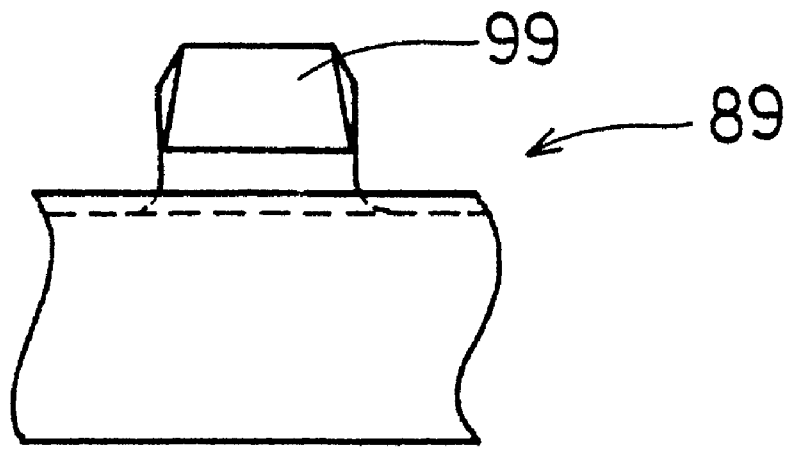
FIG. 19 is an enlarged, partial cross sectional view of a part the bushing illustrated in FIGS. 12–18 as viewed along an arrow XIX in FIG. 17.

As shown in FIGS. 4, 16 and 17, several connecting parts 99 are formed at the bushing 19 that extend from the annular portion 89 toward the first axial side. The connecting parts 99 are projections that extend toward the first axial side for transmitting a torque from the bushing 19 to the hub 3. The connecting parts 99 have cross sections that fit into gaps between the external teeth 65. The connecting parts 99 are inserted between the external teeth 65 of the hub 3. Thus, the connecting parts 99 are connected with the external teeth 65 in an unmovable manner in the circular direction.

A second cone spring 78 is an urging portion in the second friction mechanism 10 adapted to urge the second disk-shaped portion 73 and the annular portion 89 axially towards each. The second cone spring 78 is disposed axially between the bushing 19 and the external teeth 65 of the hub 3, and between the bushing 19 and the internal teeth 61 of the flange 18. The inner circumference of the second cone spring 78 is supported by the flange 64 of the hub 3, while the outer circumference of the second cone spring 78 touches the annular portion 89 of the bushing 19. The second cone spring 78 is compressed in an axial direction, and urges the bushing 19 toward the second axial side. As a result, the side face 89a of the second axial side of the annular portion 89 of the bushing 19 and the side face of the first axial side of the second disk-shaped portion 73 of the fixing plate 20 are urged towards each other in an axial direction by a predetermined force. The second cone spring 78 has inner and outer diameters smaller than those of the first cone spring 49. The second cone spring 78 also has a thickness that is much smaller than that of the first cone spring 49. Thus, an urging force of the second cone spring 78 is much smaller than that of the first cone spring 49. The second cone spring 78 has a plurality of cutouts formed at an inner circumferential edge thereof. It can be regarded that the cutouts of the cone spring 78 form a plurality of projections formed at the inner circumferential edge. The connecting parts 99 mentioned above extend within the cutouts of the cone spring 78.

As described above, the fixing plate 20 operates in the second dampening mechanism 6 as an input portion to connect with the second springs 21, as a portion constituting the second friction mechanism 10, and as a portion constituting the first friction mechanism 8. Advantages of using the fixing plate 20 are described hereinafter. The fixing plate 20, as described above, operates in the second dampening mechanism 6 as a supporting portion to support both ends of the second springs 21 in a circular direction and as a portion constituting the second friction mechanism 10. Thus, one portion has two functions, resulting in a smaller number of parts used. In addition, the fixing plate 20 supports the axial outer side of the second spring 21. Furthermore, the fixing plate 20 includes friction faces for both the second friction mechanism 10 and the first friction mechanism 8, where the second friction mechanism 10 generates a friction by sliding within the first torsional range and the first friction mechanism 8 generates a friction by sliding within the second torsional range. Thus, one portion has two friction faces, resulting in an easy adjustment and control of the friction characteristic of both friction faces. In other words, friction faces for both a flange of a boss and a hub flange do not need to be controlled, which is not a case with a conventional dampening mechanism. Particularly, the fixing plate 20 has a size and a structure that is smaller and simpler than conventional hubs or hub flanges, it is easy to control its friction face. Since the fixing plate 20 mentioned above is made of a metal plate, the fixing plate 20 with a desired shape can be obtained easily by press working, resulting in a low manufacturing cost of the fixing plate 20.

A still another advantage of the bushing 19 is described as follows. Since the bushing 19 is made of a resin, its desired shape can be obtained easily. Particularly, since the bushing 19 is made of a resin, the bushing 19 can be formed with the connecting parts 99 integrated therein, thereby making the production easy. The connecting parts 99 are connected to spaces defined circularly between the external teeth 65 of the hub 3. Therefore, it is not necessary to form a hole or concave on the connecting part 99 to connect the connecting part 99 with the hub 3. Consequently, the number of manufacturing steps for the hub 3 do not increase. The bushing 19 operates as an output portion of the second dampening mechanism 6. The bushing 19 connects with both circular ends of the second springs 21, and constitutes a part of the second friction mechanism 10. In other words, a single member performs a torque transmission and friction generation, resulting in reduced number of manufacturing parts.

The second cone spring 78 which urges the friction faces axially away from each other in the second friction mechanism 10 is supported by the flange 64 of the hub 3. Thus, the second cone spring 78 is not supported by a retaining plate but by a different member, which is not the case with a conventional retaining plate. Therefore, a hysteresis torque within the first torsional range is stable. Thus, it is easy to control the hysteresis torque of the first range. In prior arts, a retaining plate supports both first and second urging portions. Therefore, urging force of a first elastic portion may deform the retaining plate, resulting in a change of an angle of a second urging portion, destabilizing urging force of the second urging portion. In this embodiment, an urging force of the first cone spring 49 and that of the second cone spring 78 are applied in opposite axial directions with respect to the fixing plate 20. In other words, the first cone spring 49 urges the fixing plate 20 via the first friction washer 48 toward the first axial side, whereas the second cone spring 78 urges the fixing plate 20 via the bushing 19 toward the second axial side.

The second stopper 12 has a structure that does not transmit a torque to each portion of the second dampening mechanism 6 when the torque is large. When a torque is within the second torsional range, the torque is not transmitted to the bushing 19, the second coil springs 21 and the fixing plate 20. Consequently, strength of each portion does not need to be increased, and design of these members is easy.

Figure 20:
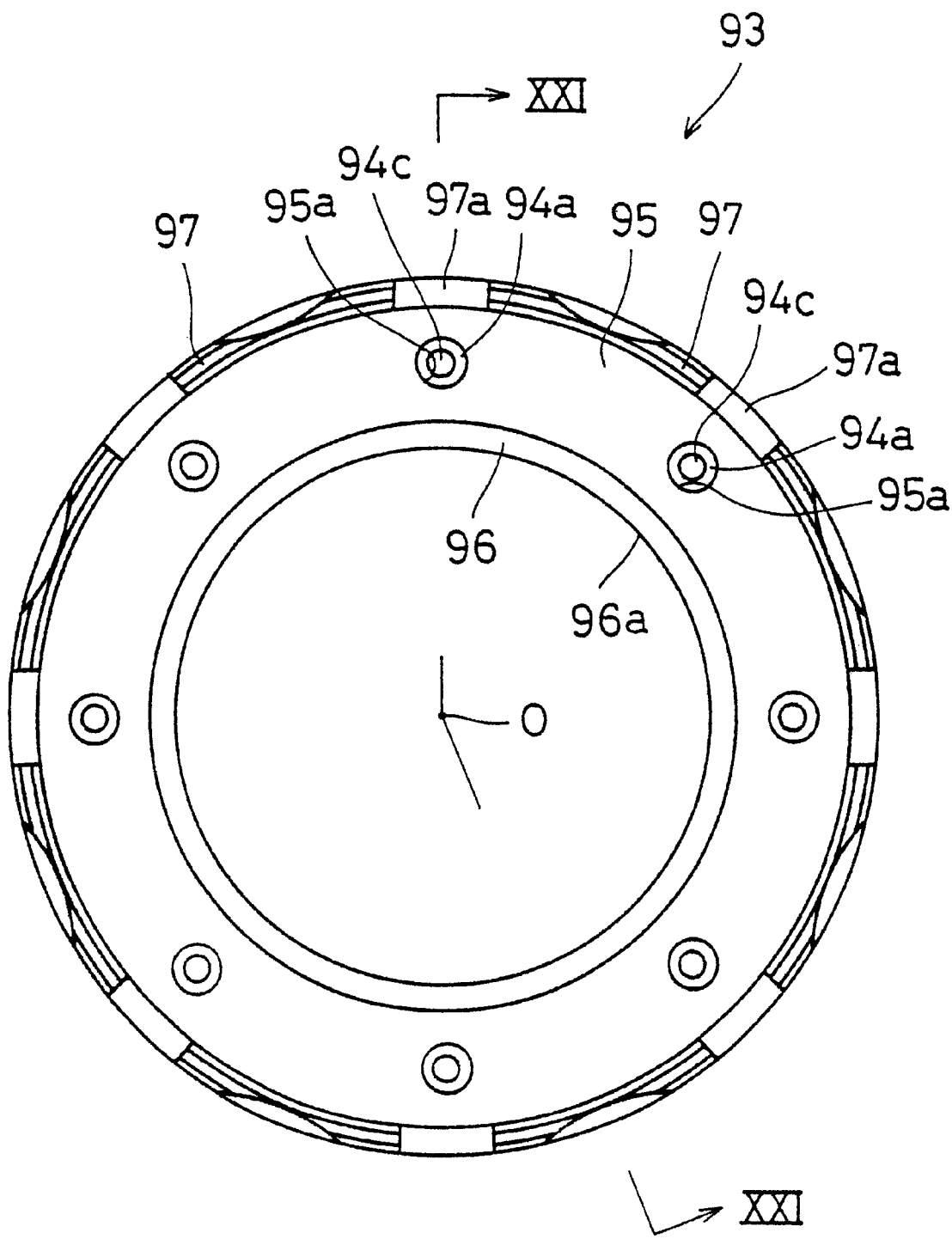
FIG. 20 is a front side elevational view of a friction bushing for use with the clutch or damper disk assembly illustrated in FIG. 1 in accordance with the present invention.
Figure 21:
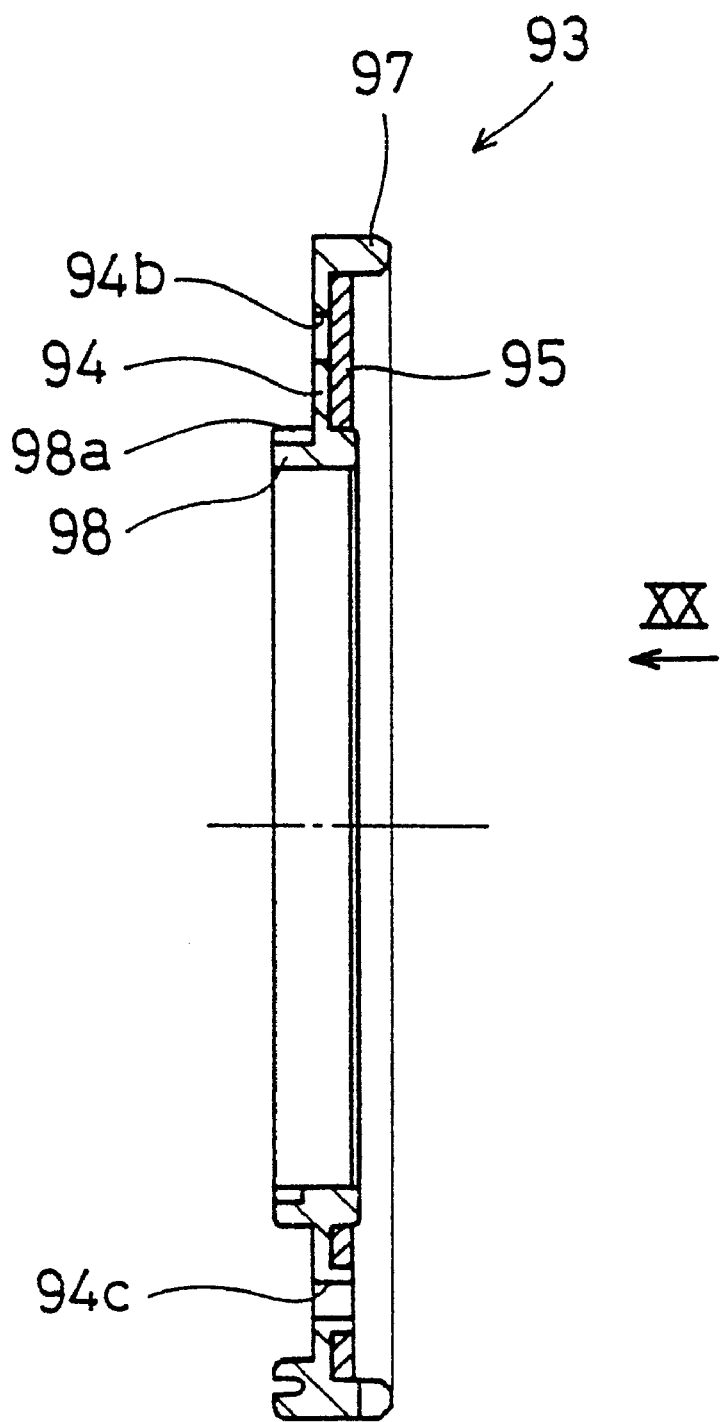
FIG. 21 is a cross sectional view of the friction bushing illustrated in FIG. 20 as viewed along section line XXI—XXI of FIG. 20.
Figure 22:
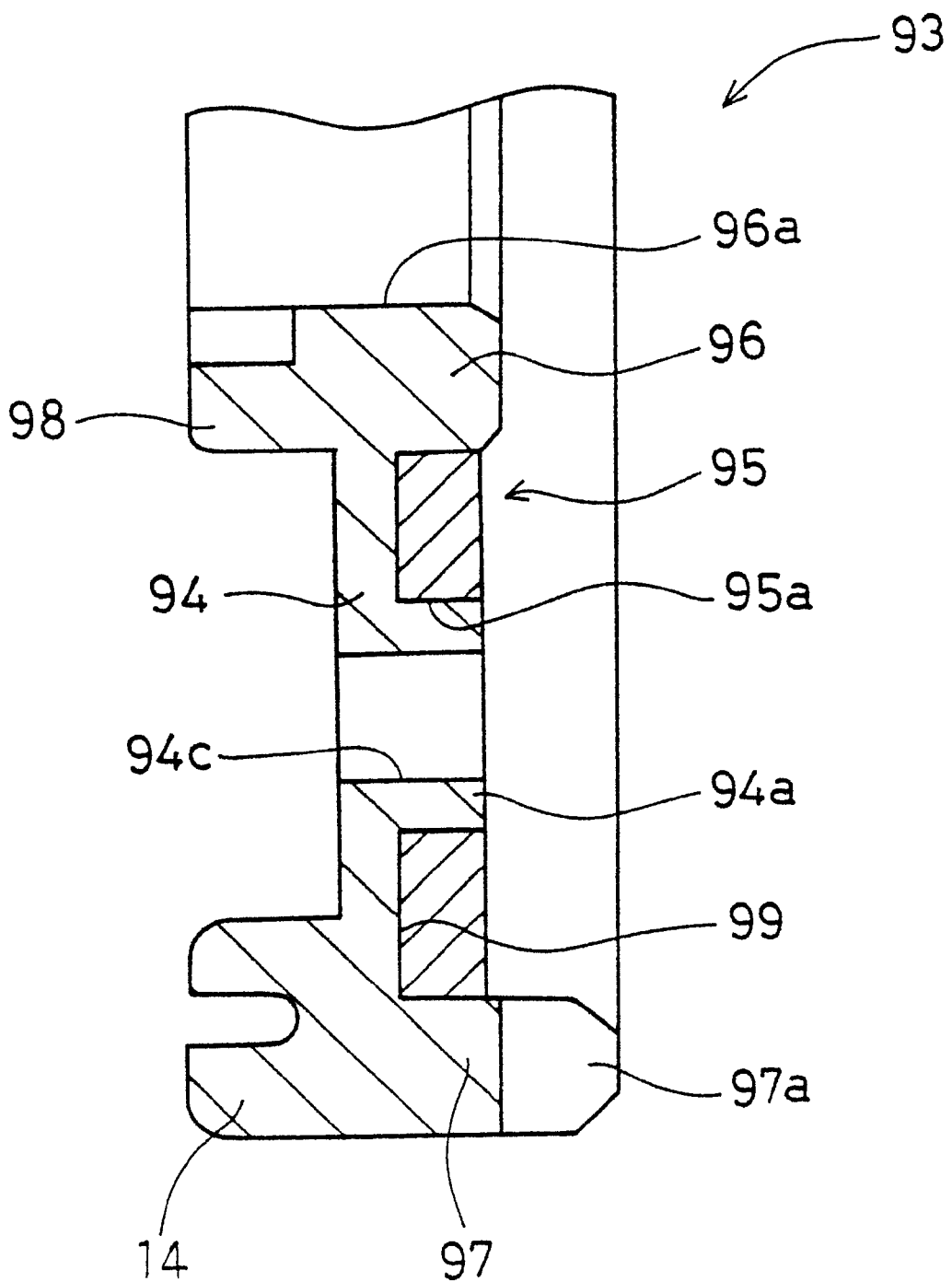
FIG. 22 is an enlarged, partial cross sectional view of a part the friction bushing illustrated in FIG. 21.

Referring to FIGS. 3–5 and 20–22, a bushing 93, which forms a part of a third dampening mechanism, will now be described in more detail. The bushing 93 is disposed at the inner circumference of the clutch plate 31 and touches the outer circumferential face of the hub 3, the end face of the flange 64, the external teeth 65, the cylinder-shaped portion 59 of the hub flange 18 and the internal teeth 61. Functions of the bushing 93 includes dampening vibrations in a rotary direction by generating a friction, determining a radial position of the clutch plate 31 relative to the hub 3, and determining a radial position of the hub flange 18 relative to the hub 3. The bushing 93, as shown in FIGS. 20 to 22, includes mainly an annular resin portion 94. The annular portion 94 is a disk-shaped portion that has a predetermined width in the radial direction and a small thickness in the axial direction. The annular portion 94 is disposed axially between the inner circumference of the clutch plate 31 and the inner circumference of the hub flange 18. An annular friction portion 95 is molded to, bonded to, or simply disposed at the annular portion 94 on the second axial side. The friction portion 95 is annular and disk-shaped, and has a predetermined width in the radial direction and a small thickness in the axial direction. The friction portion 95 is made of a material having a high friction coefficient, for example, a rubber type material, a glass type mixed fiber, spinning or impregnated compact, or a ceramic. The friction portion 95 gives a characteristic of a high friction coefficient to the bushing 93. The magnitude of its friction can be adjusted by selecting the material of friction portion 95 having a desired friction coefficient.

As shown in a plan view of FIG. 20, the inner and outer peripheries of the annular portion 94 and the friction portion 95 are circular. The friction portion 95 can be disposed so as to touch the side face of the annular portion 94 on the second axial side, or can be disposed within a channel, which is formed at the side face of the annular portion 94 on the second axial side. In other words, a cylinder-shaped part 96 is formed at the inner circumferential edge of the annular portion 94, extending toward the second axial side therefrom, and a cylinder-shaped part 97 is formed at the outer circumferential edge of the annular portion 94, extending toward the second axial side therefrom. An annular space surrounded by the cylinder-shaped portions 96 and 97 forms a channel of the annular portion 94. Inner and outer peripheries of the channel are circular, and the friction portion 95 is disposed within the channel.

The cylinder-shaped portion 96, i.e., the bushing 93, touches the side face of the flange 64 of the hub 3 on the first axial side as seen in FIG. 4. The bushing 93 and the flange 64 are urged towards each other by the second cone spring 78. The cylinder-shaped portion 96 and the flange 64 slide within the first range of torsional angle. The friction portion 95, i.e., bushing 93, touches the cylinder-shaped portion 59 of the hub flange 18 and the end face of the internal teeth 61 on the first axial side. The bushing 93, in other words the clutch plate 31, and the hub flange 18 are urged towards each other by the first cone spring 49. This portion slides within the second range of torsional angle. A small gap is secured between the friction portion 95 and the side face of the external teeth 65 of the hub 3 on the first axial side. The cylindershaped portion 59 of the hub flange 18 and the end face of the internal teeth 61 on the first axial side touch only the friction portion 95 in an axial direction.

Several holes 95a are formed side by side in a circular direction at the friction portion 95, and projections 94a of the annular portion 94 are inserted in the holes 95a. In this way, a whirl stop between the annular portion 94 and the friction portion 95 is achieved. Particularly, since the friction portion 95 has a circular shape, such a whirl stop plays an important role. In conventional friction portions, even when a friction portion is adhered to a backboard made of SPCC, as long as the friction portion is circular, there is a possibility of a problem in relation to the strength of the friction portion, such as a friction portion peeling off from the backboard. Therefore, in the prior arts, a whirl stop is achieved by using a friction portion having a square shape. While the friction portion 95 in accordance with the present invention has a simple structure with a circular shape, it does not have a problem such as a peeling. Particularly, it is easy to form the holes 95a of the friction portion 95 and the projections 94a of the annular resin portion 94, resulting in a reduction of a cost.

In the present embodiment, since the friction portion 95 is not fixedly coupled to the annular portion 94, the friction portion 95 can come off in the axial direction. Therefore, processes such as bonding are not necessary. However, in this embodiment in accordance with the present invention, the friction portion 95 may be bonded to the annual portion 94.

Several holes 94b are formed side by side in the circular direction in the annual portion 94. The holes 94b extend in the axial direction. Also, the holes 94b connect the first axial side and second axial side of the annular portion 94, and expose a part of the first axial side face of the friction portion 95. As seen in FIG. 3, holes 13 are formed at the inner circumference of the clutch plate 31, corresponding to the holes 94b. The holes 13 have a diameter larger than that of the holes 94b, and expand beyond the circumference of the holes 94b. Thus, a part of the friction portion 95 is exposed to the outside of the clutch disk assembly 1 through the holes 94b and the holes 13, which are formed at identical positions. Therefore, the friction portion 95 is cooled sufficiently. In other words, the friction portion 95 radiates a heat to an outer atmosphere on the clutch plate 31 side, resulting in a prevention of a change of the friction characteristic due to a friction heat of the friction portion 95. Moreover, a resistance to wear of the friction portion 95 increases, while rigidity of the hub 3 and the hub flange 18 is maintained. In addition, holes 94c are formed extending in an axial direction and penetrating the projections 94a. The holes 94c connect the first and second axial sides of the annular portion 94. The holes 94b and 94c reduce a total volume of the bushing 93, resulting in a reduction of an amount of resin used, and therefor a reduction of cost.

A cylinder-shaped part 98 extending towards the first axial side is formed at the inner circumferential edge of the annular portion 94. The inner circumferential face of the cylinder-shaped portions 96 and 98 touches the outer circumferential face of the boss 62. In this way, the clutch plate 31 and the retaining plate 32 are radially positioned (centered) relative to the hub 3. In addition, a channel 98a connecting with a plurality of projections that are formed at the inner circumferential edge of the clutch plate 31 is formed at the outer circumferential face of the cylinder-shaped portion 98. In this way, the bushing 93 can rotate together with the clutch plate 31, and slide against the flange 64 of the hub 3 and the cylinder-shaped portion 59 of the hub flange 18.

A plurality of cutouts 97a is formed at the cylinder-shaped portion 97. The radial inner side face of the cylinder-shaped portion 97 touches the outer circumferential face on the first axial side of the cylinder-shaped portion 59 of the hub flange 18. In other words, the hub flange 18 is positioned radially relative to the hub 3, the clutch plate 31 and the retaining plate 32, by the cylinder-shaped portion 97 of the bushing 93.

A plurality of connecting parts 14 extending toward the first axial side is formed at the outer circumferential edge of the annular portion 94. The connecting parts 14 are formed at equal intervals in the circular direction. The connecting parts 14 have nail like shapes, and are connected with holes 15 formed on the clutch plate 31 as seen in FIG. 4. Thus, the bushing 93 is temporarily connected with the clutch plate 31 in the axial direction.

The bushing 93 mentioned above positions the clutch plate 31 relative to the hub 3 in a radial direction by touching the outer circumferential face of the boss 62, and generates a hysteresis torque of the first and second ranges from a friction face that touches each of the flange 64 and the cylinder-shaped part 59. In other words, a single member has a plurality of functions, resulting in a reduced number of total members.

When the clutch disk 33 of the input rotary portion 2 is pressed against a flywheel (not shown in the Figures), a torque is inputted to the clutch disk assembly 1. The torque is then transmitted from the clutch plate 31 and the retaining plate 32 to the first spring 16, the hub flange 18, the spacer 80, the fixing plate 20, the second spring 21 and the bushing 19 in this order. Finally, the torque is outputted from the hub 3 to the transmission shaft (not shown in the Figures).

When a torque fluctuation from an engine is inputted to the clutch disk assembly 1, a torsion vibration or a relative rotation is caused between the input rotary portion 2 and the hub 3, whereby the first springs 16, the springs 17 and the second springs 21 are compressed in the rotary direction.

Figure 7:
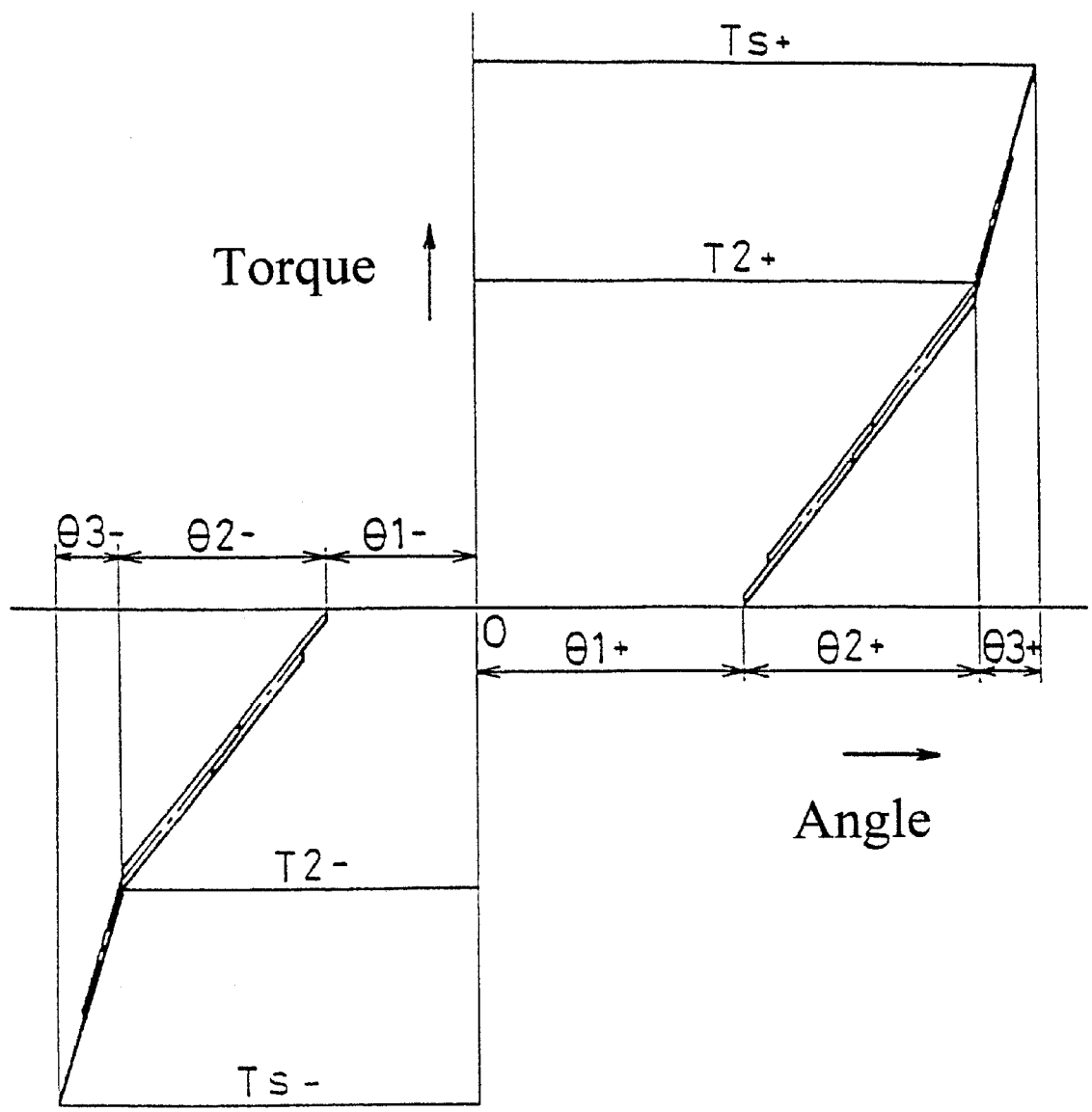
FIG. 7 shows a torsion characteristic curve of the clutch or damper disk assembly in accordance with the present invention.

Referring to a machine circuit in FIG. 6 and a torsion characteristic curve in FIG. 7, an operation of the clutch disk assembly 1 as a dampening mechanism will now be described in more detail. The machine circuit shown in FIG. 6 indicates a schematic view of a dampening mechanism 4 formed between the input rotary portion 2 and the hub 3. In FIG. 6, relationships between portions, particularly when the hub 3 is twisted in a certain direction (e.g., R2 direction) against the input rotary portion 2 are shown.

When the hub 3 is twisted in a R2 direction against the input rotary portion 2, the second dampening mechanism 6 mainly operates within a range of a torsion angle of up to $\theta_1$. In other words, the second springs 21 are compressed in the rotary direction, causing a slip in the second friction mechanism 10. In this case, since a slip is not caused in the first friction mechanism 8, a characteristic of a high hysteresis torque does not appear. As a result, a characteristic of the first range of torsion angle with a low rigidity and a low hysteresis torque is obtained. When the torsion angle exceeds the torsion angle $\theta_1$, the second stopper 12 touches, stopping a relative rotation between the hub 3 and the hub flange 18. In other words, the second dampening mechanism 6 does not operate when the torsion angle is larger than $\theta_1$. Thus, the second springs 21 are not further compressed when the torsion angle is larger than $\theta_1$. Therefore, the second springs 21 are not likely to be broken. In addition, it is not necessary to consider the strengths of the second springs 21, whereby design of the second springs 21 is easy. The first dampening mechanism 5 operates at the second range of a torsion angle. In other words, the first springs 16 are compressed in the rotary direction between the hub flange 18 and the input rotary portion 2, resulting in a slip in the first friction mechanism 8. As a result, a characteristic of the second range of torsion angle with a high rigidity and a high hysteresis torque is obtained. When the torsion angle is larger than $\theta_1+\theta_2$, the circular end of the springs 17 touches the second supporting part 37 of the second receptacle 36. In other words, the second dampening mechanism 6, the first springs 16 and the springs 17 are now compressed in parallel. As a result, rigidity in the third range of torsion angle is higher than that in the second range. When the torsion angle is $\theta_1+\theta_2+\theta_3$, the first stopper 11 touches, stopping a relative rotation between the input rotary portion 2 and the hub 3.

In a negative side of a torsion angle, a similar characteristic is obtained although a magnitude of each predetermined torsion angle ($\theta_1$, $\theta_2$, and $\theta_3$) is different. In the first range of torsion angle, a friction is generated between the bushing 93 and both the flange 64 of the hub 3, and between the bush 93 and the external teeth 65. In the second and third ranges, a friction is generated between the bushing 93 and the inner circumference of the hub flange 18.

When an abrasion of the bushing 19 progresses at a friction face between the annual portion 89 and the second disk-shaped portion 73 in the second dampening mechanism 6, it is thought that the bushing 19 moves from other portions toward the second axis side. If this happens, a posture of the second cone spring 78 changes, in particular, it arises. As the result, an urging force (setting load) of the second cone spring 78 changes. In particular, it once increases and then decreases. Thus, a magnitude of a hysteresis torque in the second friction mechanism 10 changes and is not stable.

In the present invention, however, the first cone spring 49 urges the fixing plate 20 toward the first axis side, and its urging force is applied to the hub flange 18 and the bushing 93. Therefore, when an amount of abrasion in the second friction mechanism 10 corresponds to or coincides with an amount of abrasion at a friction face between the bushing 93 and the hub flange 18, the following results can be obtained. When a part (the friction portion 95) of the bushing 93 corresponding to the cylinder-shaped part 59 of the hub flange 18 abrades, the hub flange 18, the spacer 80, the fixing plate 20 and the first friction washer 48 all move toward the first axis side corresponding to an amount of the abrasion. As the result, at the friction face in the second friction mechanism 10, the second disk-shaped portion 73 moves toward the first axis side. The location of the bushing 19 against the hub 3 in an axial direction hardly changes. Therefore, a posture of the second cone spring 78 which is disposed between the flange 64 and the bushing 19 hardly changes. Thus, an abrasion following mechanism using the hub flange 18 and the first friction mechanism 8 keeps a posture of the second cone spring 78 constant, regardless of an abrasion at the friction face of the second friction mechanism 10, resulting in a stable generation of a hysteresis torque in the second friction mechanism 10. As the result, a hysteresis torque that shows a small change with the passage of time can be obtained, leading to an improved sound and vibration performance. In addition, since it is not necessary to consider an abrasion margin of the second cone spring 78, the degree of freedom to design the second cone spring 78 increases. In particular, it is possible to design the second cone spring 78 with a low stress and a high load. A set load of the second cone spring 78 is set to be approximately a peak of a load characteristic in a cone spring. When an amount of abrasion in the bushing 19 is kept to be equal to that in the bushing 93, the load of the second cone spring 78 is kept to be approximately a maximum. When an amount of abrasion in the bushing 19 is different from that in the bushing 93, the set load shifts slightly from a peak of a load characteristic to both its side. In this case, an amount of variation of a set load is set so as to be a minimum, in addition its amount is predictable.

Second Embodiment

Figure 23:
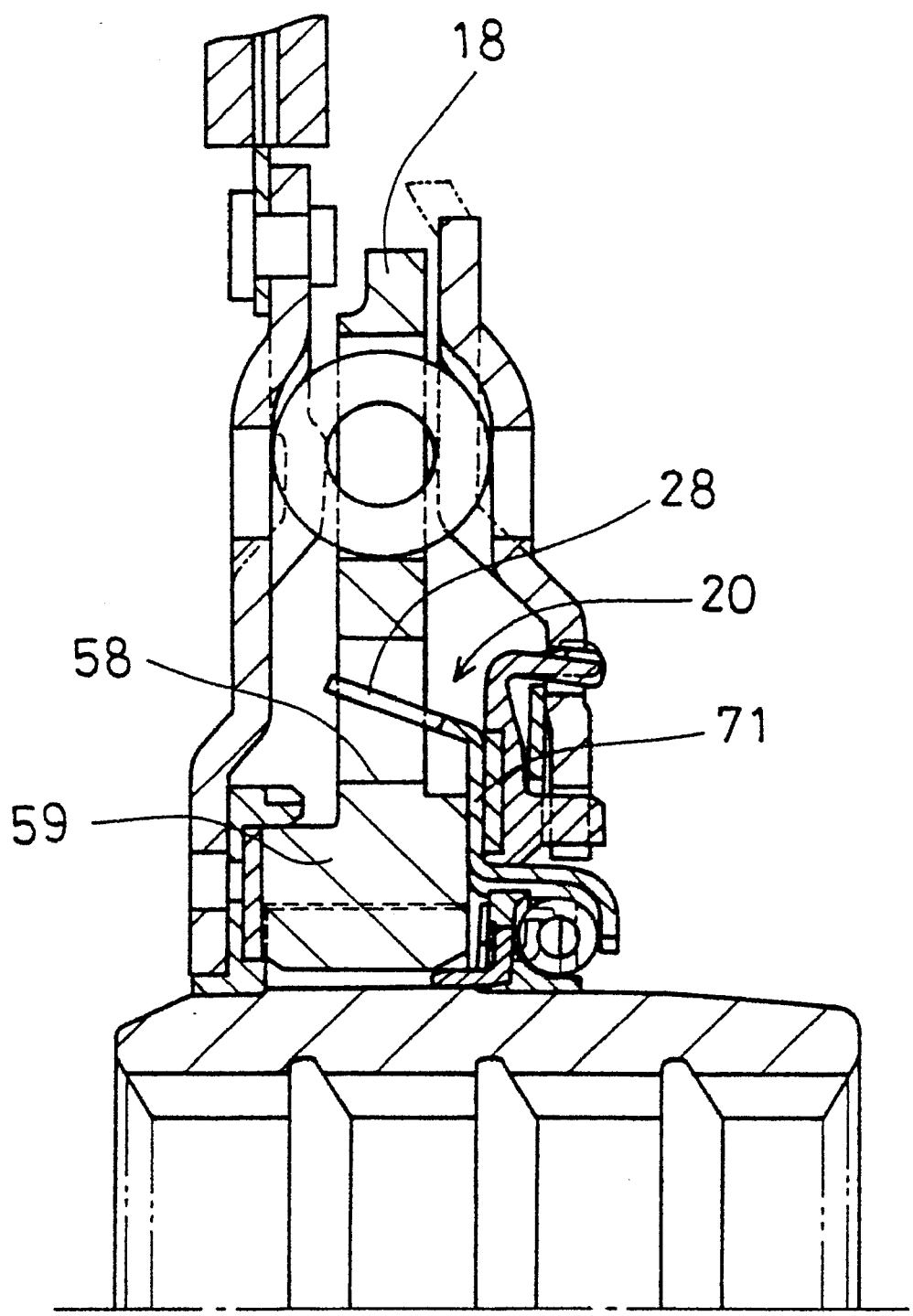
FIG. 23 is a partial cross sectional view of a part of a clutch or damper disk assembly in accordance with another embodiment of the present invention, corresponding to FIG. 3 of the first embodiment.
Figure 24:
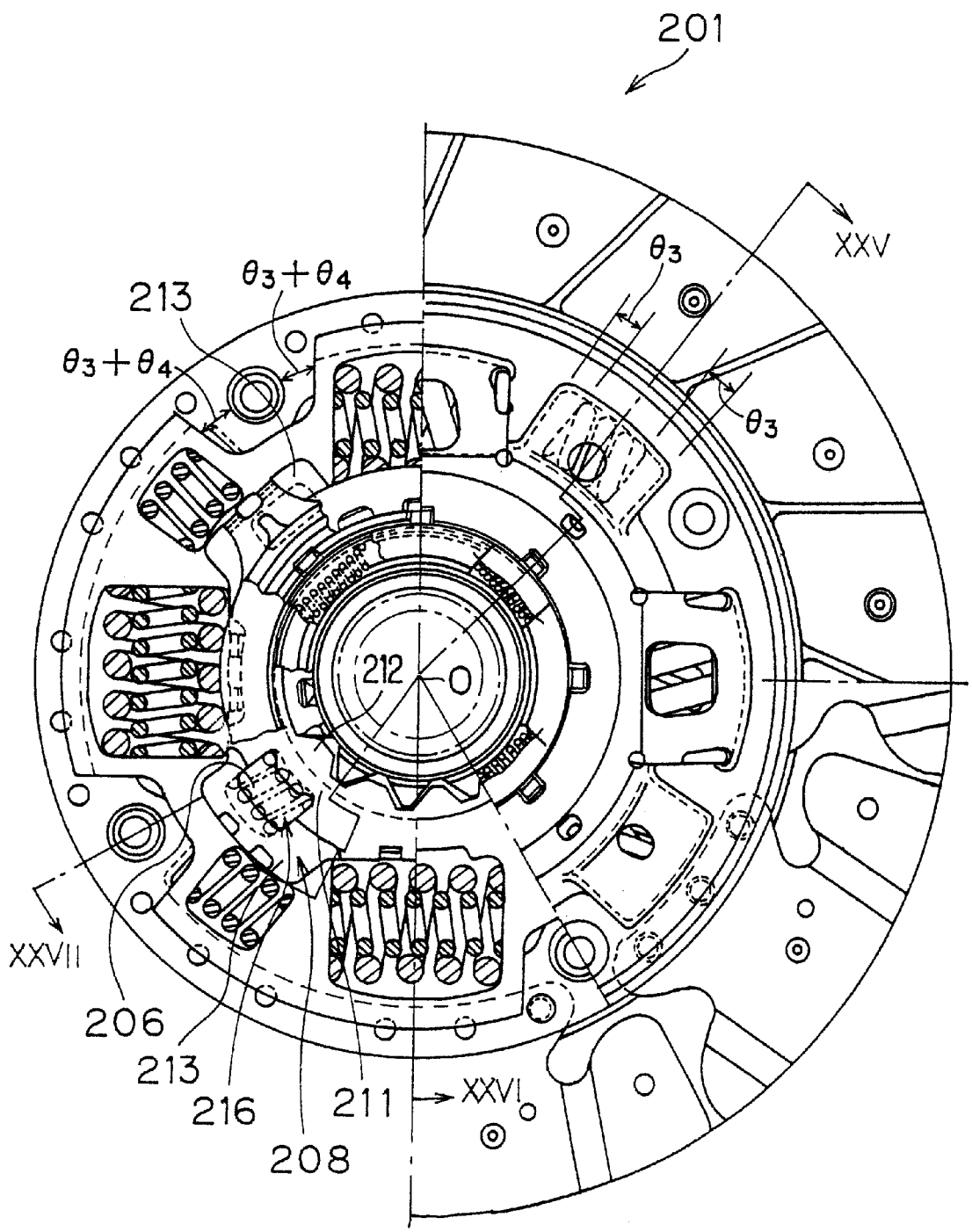
FIG. 24 is a plan view of a clutch or damper disk assembly according to a second embodiment of the present invention.

Referring now to FIG. 23, a modified version of the clutch disk assembly 1 is illustrated in accordance with another embodiment of the present invention. The clutch disk assembly 1 of FIG. 23 has the same basic structure as the first embodiment. Accordingly, only differences from the first embodiment are described below in explaining this embodiment.

As shown in FIG. 23, the spacer 80, described in the above embodiment, can be removed, and a fixing plate 20 may be connected directly with a hub flange 18. A first disk-shaped part 71 of a fixing plate 20 is supported directly by a cylinder-shaped part 59 of a hub flange 18. In addition, connecting nails 28 extend from the outer circumferential edge of the first disk-shaped part 71 into connecting holes 58 of the hub flange 18. In this structure, the spacer 80 can be removed, resulting in a small number of parts.

In a machine circuit in FIG. 6, other elastic portion or a spring may be disposed at a location of a spacer 80. In that case, four steps of characteristic can be obtained. In a description of the present embodiment, such a phrase as "connect so as to rotate in a body" and "connect relatively unrotatably" means that both portions are disposed so as to be able to transmit a torque in a circular direction. In other words, it also contains a condition in which a gap is formed in a rotary direction between both portions and a torque is not transmitted between both portions within a predetermined angle.

In both embodiments, the dampening disk assembly of the present invention has first and second friction mechanisms that rub a common member, which is common to both of them. Thus, since the two friction mechanisms rub against a common member, it is easy to control a magnitude of a friction generated at a friction face.

Third Embodiment

Referring now to FIGS. 24 to 37, a clutch disk assembly 201 is illustrated in accordance with another embodiment of the present invention. The clutch disk assembly 201 has the same basic structure as the first embodiment. Accordingly, only differences from the first embodiment are described below in explaining this embodiment.

The clutch disk assembly 201 of the third embodiment has four-stage characteristics, and is different in this point from the clutch disk assembly 1 of the first embodiment having the three-stage characteristics. More specifically, as shown in a mechanical circuit diagram of FIG. 36, sub-plates 207 and 208 as well as a set of compressible springs 206 (second elastic member) are disposed between the fixing plate 20 and the hub flange 18 instead of the spacer 80 in the first embodiment. The sub-plates 207 and 208 receive the torque from the fixing plate 20. The springs 206 elastically couple the sub-plates 207 and 208 to the hub flange 18 (second intermediate member) in the rotating direction. The sub-plates 207 and 208 can rotate through an angle of $\theta_1$ with respect to the hub 3 in each of the opposite rotating directions. The hub flange 18 is rotatable with respect to the hub 3 through an angle of $(\theta_1+\theta_2)$ in each of the positive and negative rotating directions. In this structure, the angle of $(\theta_1+\theta_2)$ corresponds to the angle of $\theta_1$ in the first embodiment. In other words, the second stage of the characteristics, in which the springs 206 operate, is provided in the range not exceeding the angle of $\theta_1$ in the first embodiment.

Figure 25:
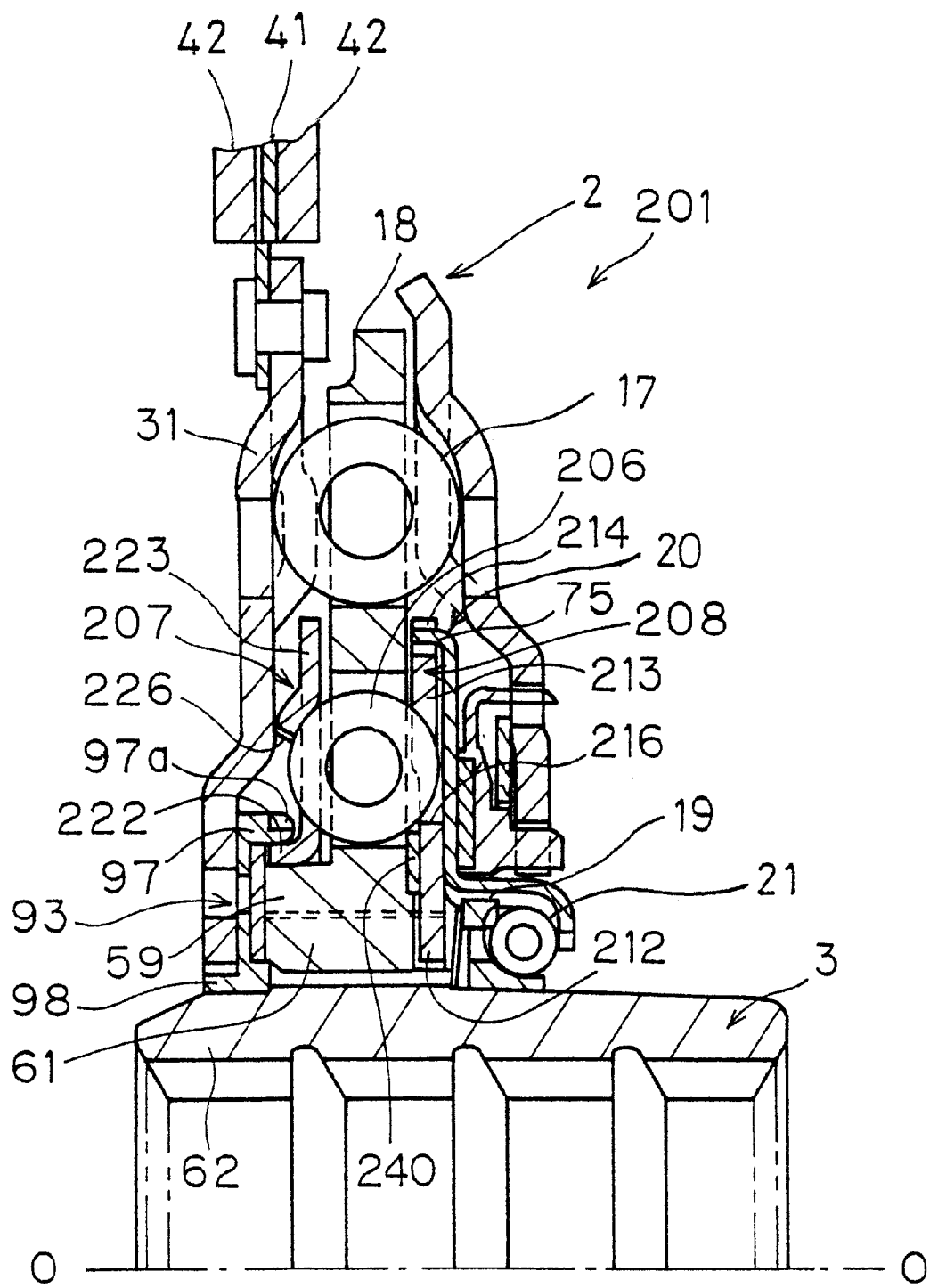
FIG. 25 is a cross sectional view of a clutch or damper disk assembly as viewed along an allow XXV-O in FIG. 24.
Figure 36:
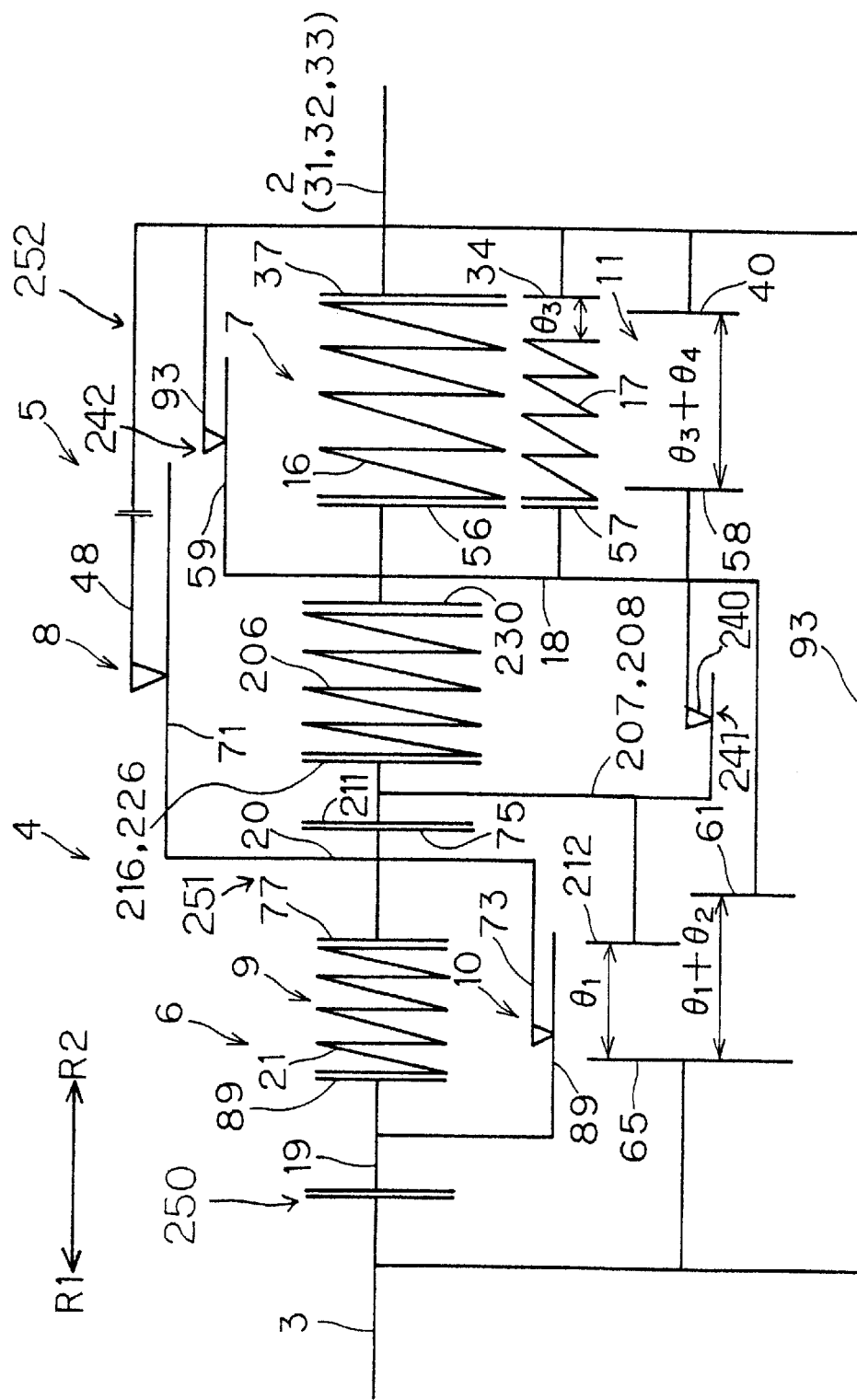
FIG. 36 is a diagrammatic machine circuit drawing of a clutch or damper disk assembly in accordance with the present invention.

The mechanical circuit diagram of FIG. 36 for this embodiment is a schematic diagram that shows the relationships between the respective members in the rotating direction. Accordingly, the members are deemed as a single member, which operate together in the rotating direction. More specifically, the hub 3 and the bushing 19 form a first rotary member 250, which is integrally coupled in the rotating direction as seen in FIG. 25. The fixing plate 20 and the sub-plates 207 and 208 function as a first intermediate member 251 which functions between the second springs 21 and the springs 206. The first intermediate member 251 cooperates with the first rotary member 250 to form the friction mechanism 10 therebetween. The first intermediate member 251 also cooperates with the input rotary member 2 to form the friction mechanism 8 therebetween. The first intermediate member 251 cooperates with the hub flange 18 to form the second friction mechanism 241 therebetween. Further, the intermediate member 251 cooperates with the hub 3 to form the stop mechanism having the space angle of $\theta_1$. The input rotary member 2 is configured to rotate together with the first friction washer 48 and the bushing 93, which together form a second rotary member 252.

Referring again to FIG. 36, the springs 206 serve as the spring or elastic member (second elastic member) to be compressed in the second stage of the four-stage characteristics achieved by the dampening mechanism. The springs 206 are the second elastic member, which is disposed in series with respect to the springs 21 (first elastic member) to be compressed in the first stage. The springs 206 are also disposed in series with respect to the first springs 16 (third elastic member) to be compressed in the third stage. The springs 206 are connected in the rotating direction to the second springs 21 via the fixed plate 20 and the first and second sub-plates 207 and 208. The springs 206 are coupled in the rotating direction to the first springs 16 via the hub flange 18. The springs 206 have a much higher rigidity than the second springs 21, and is hardly compressed in the first stage.

The springs 206 have a lower (but not much lower) rigidity than the first springs 16. Therefore, when the springs 206 are compressed to some extent, the springs 206 can generate a torque exceeding a sum of an initial torque of the first springs 16 and the hysteresis torque of the friction mechanism 242 (i.e., a torque based on a resistance which is generated at the frictionally engaged portions when the springs 206 apply a load onto the first springs 16).

The friction mechanism 241 (second friction mechanism) is disposed for operation in parallel with the springs 206, and more strictly, the friction mechanism 241 is configured to generate a friction only when the springs 206 operate. The friction mechanism 241 is disposed so that it operates in series with respect to the friction mechanism 242 which in turn operates in parallel with the first springs 16. When sliding occurs in both the friction mechanisms 241 and 242, an intermediate hysteresis torque of a magnitude intermediate the magnitudes of the respective hysteresis torques is generated.

Figure 35:
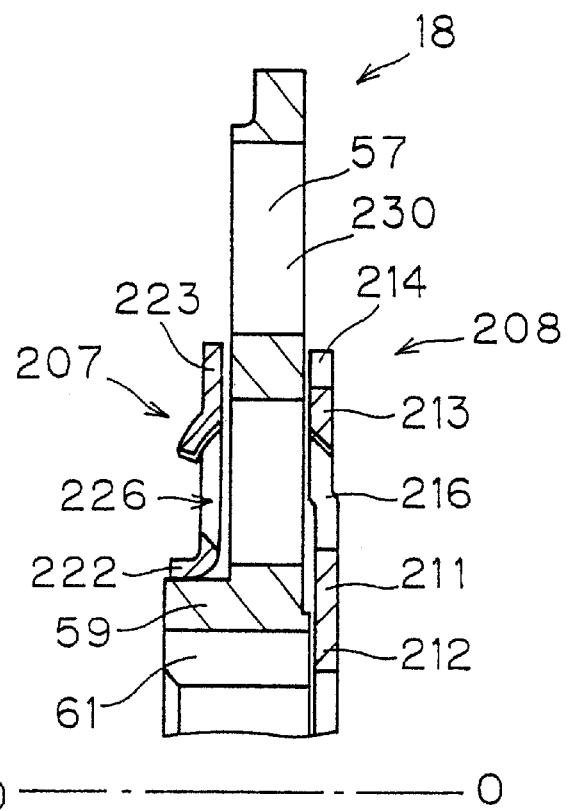
FIG. 35 is a cross sectional view of a hub flange and first and second sub plates to show an engagement therebetween.
Figure 35:
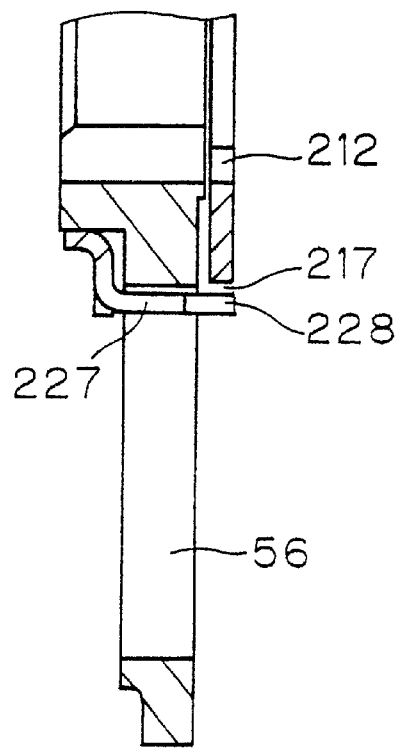

As seen in FIG. 35, first sub-plate 207 is disposed on the engine side with respect to the hub flange 18, while the second sub-plate 208 is disposed on the transmission side with respect to the hub flange 18. The sub-plates 207 and 208 are coupled together for integral rotation. The first and second sub-plates 207 and 208 function together with the fixed plates 20 as the intermediate member 251 (first intermediate member) for coupling the springs 21 and the spring 206 to each other in the rotating direction. The second sub-plate 208 has internal teeth 212, which form the foregoing, stop mechanism together with the outer teeth 65 of the hub 3. Owing to the stop mechanism, the springs 21 are not compressed when the torsion angle exceeds the angle of $\theta_1$.

Figure 30:
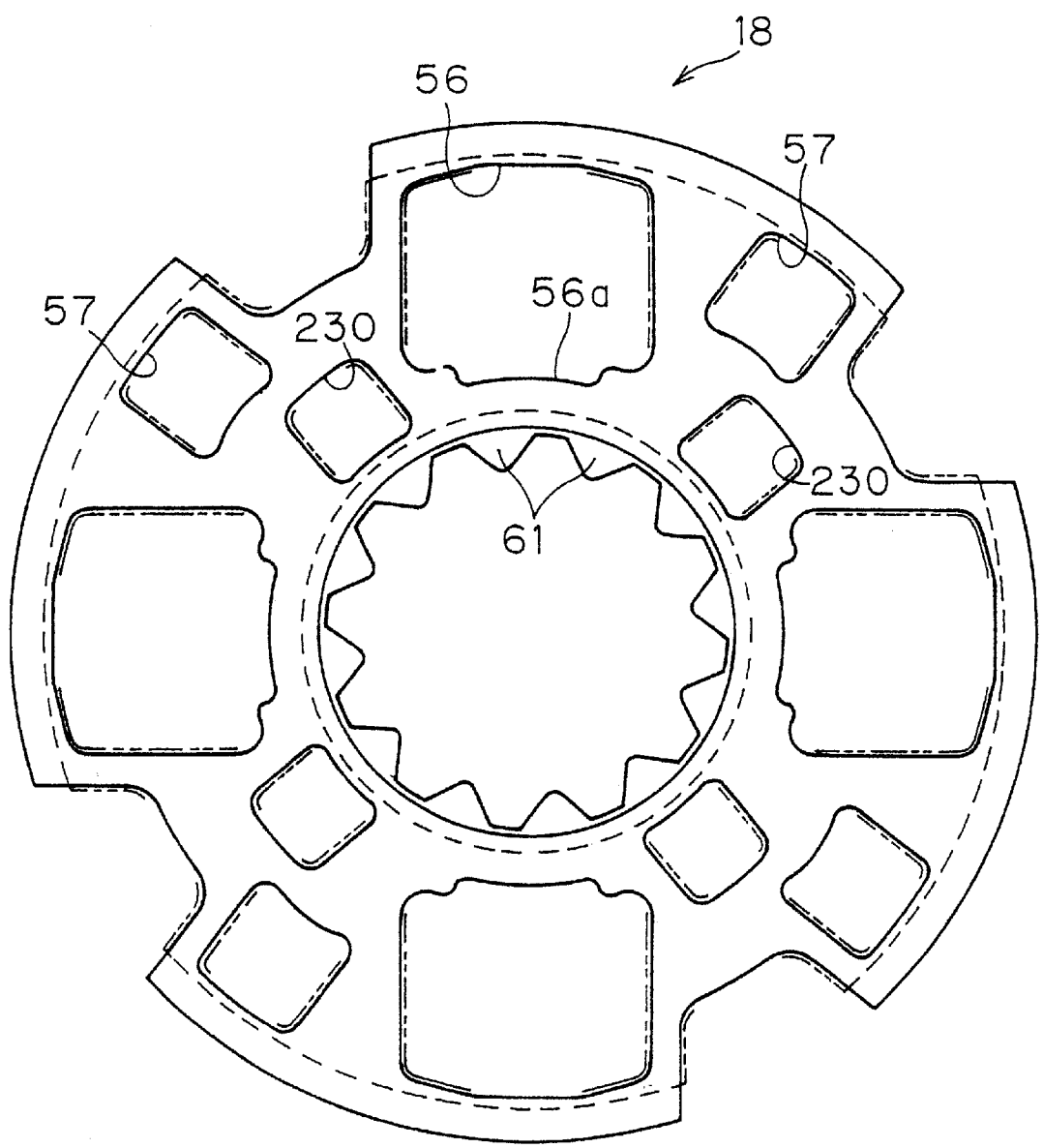
FIG. 30 is a plan view of a hub flange in accordance with the present invention.

As shown in FIG. 30, the hub flange 18 has a plurality of third window holes 230 (second windows) formed therein.

The third window holes 230 are formed in circumferentially equally spaced four positions, respectively. Each third window hole 230 has radial and circumferential sizes, which are smaller than those of the second window holes 56 (first windows) and the first window holes 57. Each third window hole 230 is formed at the radially innermost position in the hub flange 18. The springs 206 are disposed within the third window holes 230. The springs 206 are coil springs that extend in the circumferential direction. The opposite ends of the springs 206 are in contact with or close to the circumferential opposite ends of the third window holes 230, respectively.

Figure 26:
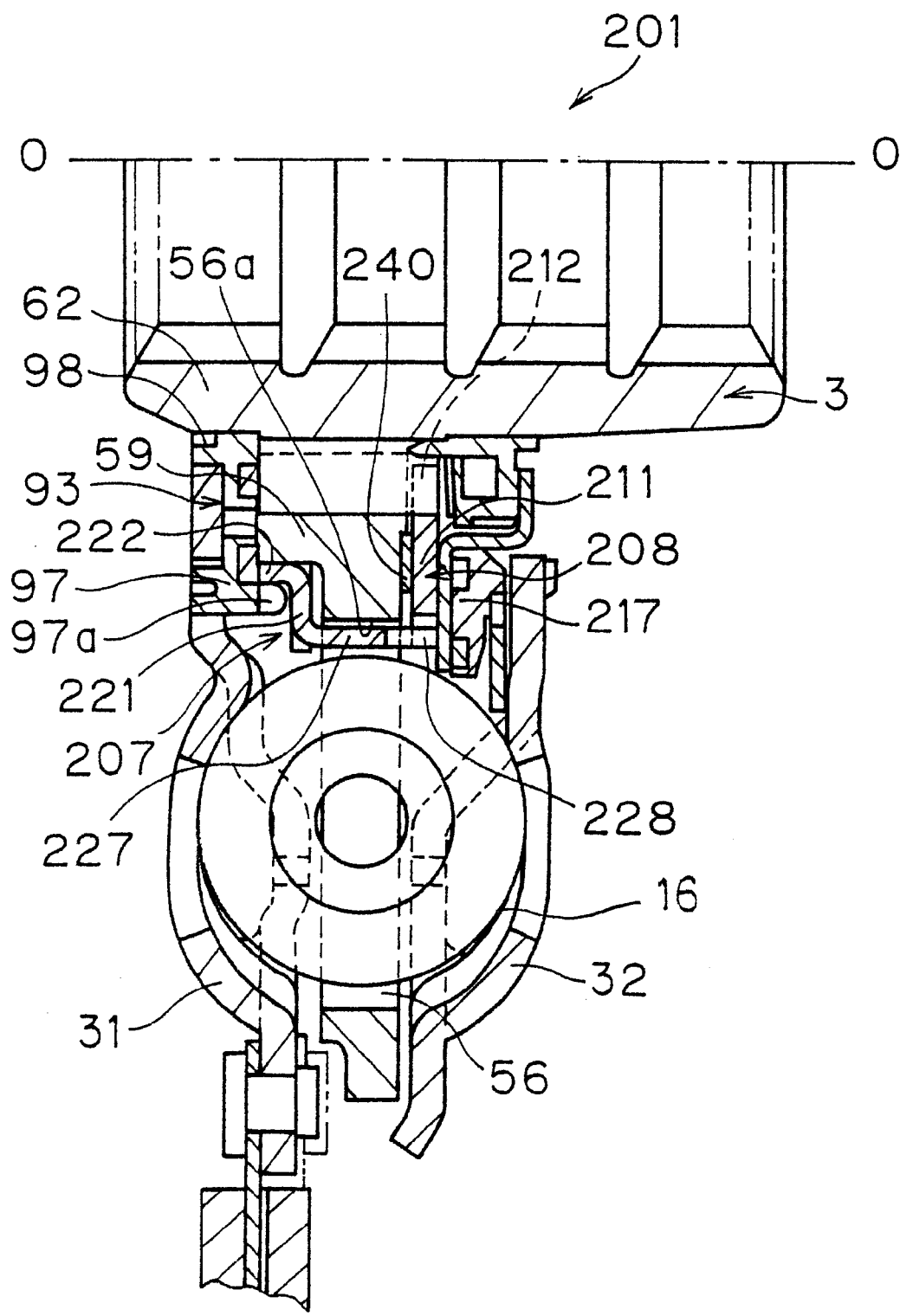
FIG. 26 is a cross sectional view of a clutch or damper disk assembly as viewed along an allow XXVI-O in FIG. 24.
Figure 27:
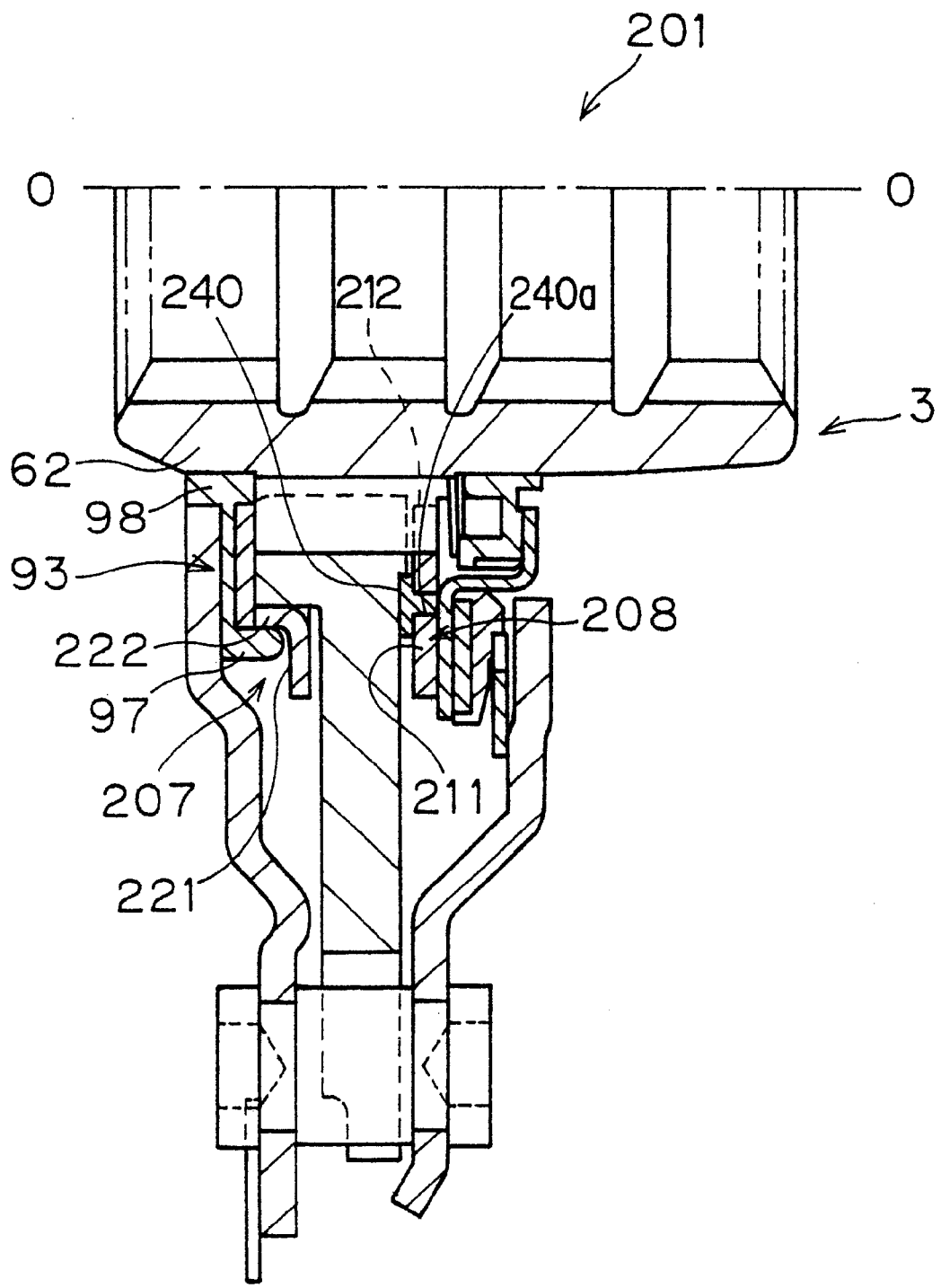
FIG. 27 is a cross sectional view of a clutch or damper disk assembly as viewed along an allow XXVII-O in FIG. 24.
Figure 28:
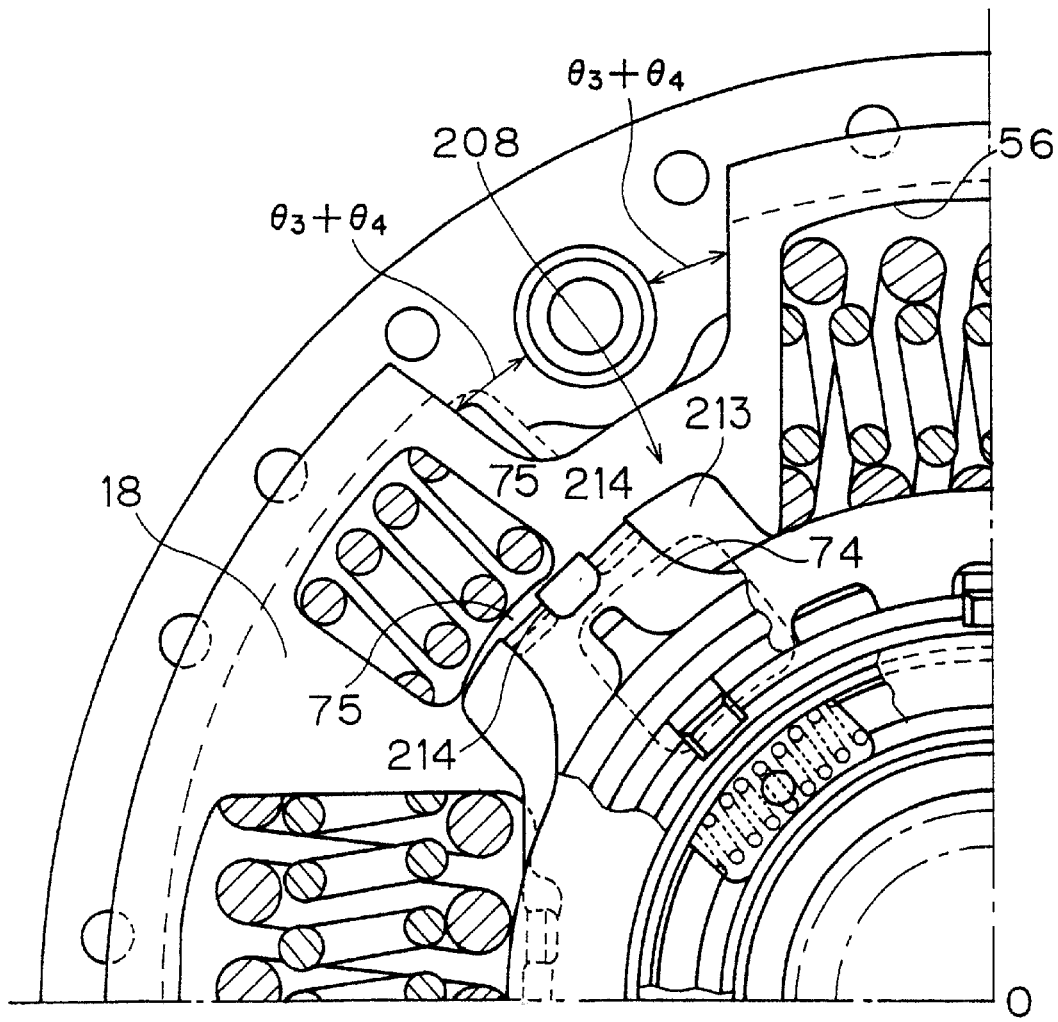
FIG. 28 is an enlarged, partial cross sectional view of a clutch or damper disk assembly illustrated in FIG. 24.
Figure 29:
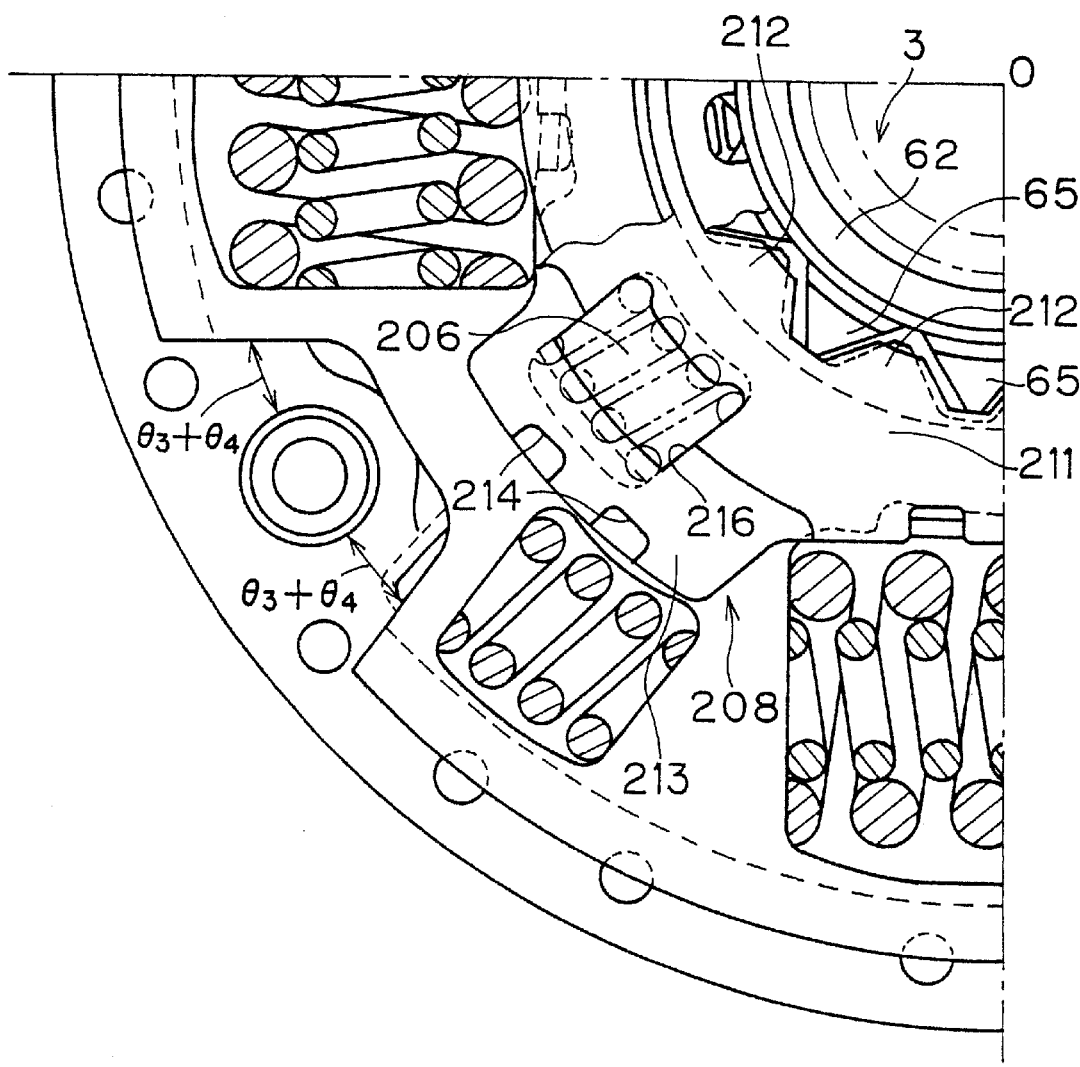
FIG. 29 is an enlarged, partial cross sectional view of a clutch or damper disk assembly illustrated in FIG. 24.
Figure 32:
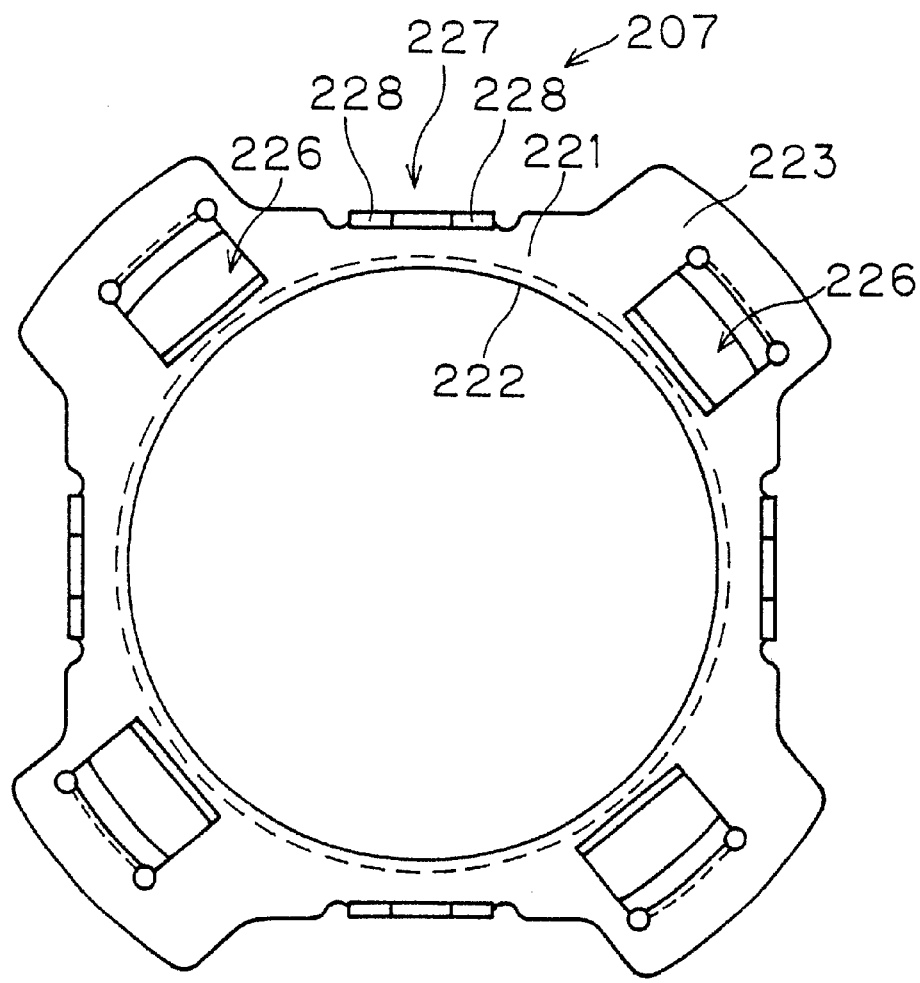
FIG. 32 is a plan view of a first sub plate in accordance with the present invention.

As seen in FIGS. 25–27, the first sub-plate 207 is disposed between the hub flange 18 and the clutch plate 31. The first sub-plate 207 is a circular or annular member as shown in FIG. 32. More specifically, the first sub-plate 207 is made of sheet metal. The first sub-plate 207 is primarily made of an annular portion 221. The first sub-plate 207 is also provided with an annular portion 222, which projects toward the engine from the annular portion 221 as seen in FIG. 25. The annular portion 222 forms an annular support portion or a radial positioning portion. The inner peripheral surface of the cylindrical portion 222 is in rotatable contact with the outer peripheral surface of the cylindrical portion 59 of the hub flange 18 as seen in FIG. 25. More specifically, cylindrical portion 222 radially positions the first sub-plate 207 with respect to the hub flange 18. The cylindrical portion 97 of the bushing 93 is in contact with the outer peripheral surface of the cylindrical portion 222.

Referring again to FIG. 32, the first sub-plate 207 is also provided with a plurality of projections 223, which extend from the annular portion 221 and are circumferentially equally spaced from each other. Each projection 223 extends continuously and radially outward from the annular portion 221. The projections 223 are formed correspondingly to the third window holes 230 that are formed in the hub flange 18, respectively. Each projection 223 is provided with a cut and bent portion 226 located in the annular portion 221 and the projection 223. Each cut and bent portion 226 is formed by partially cutting and bending in the axial direction a portion in the annular portion 221 and the projection 223 to form a hole. The edges cut and bent portions 226 support the circumferential opposite ends, diametrically opposite ends and axially one side (engine side) of the corresponding springs 206 as seen in FIG. 25. Further, the cut and bent portion 226 has a portion that is in contact with a transmission side of the clutch plate 31.

Figure 33:
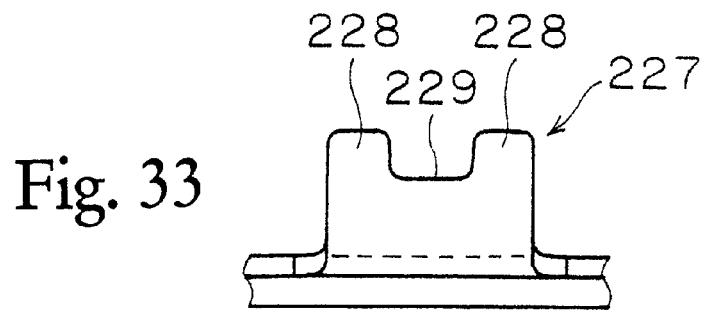
FIG. 33 is a side view of a first sub plate as viewed along an allow XXXIII in FIG. 32.

As seen in FIGS. 32 and 33, the annular portion 221 is provided at its outer periphery with projections 227 (engagement portions) located circumferentially between the neighboring projections 223. Each projection 227 is bent at the outer periphery of the annular portion 221, and extends axially toward the transmission from the bent edge. Each projection 227 is provided at its circumferential opposite ends with two axially projected claws 228, as shown in FIG. 33. In other words, the projections 227 are provided at their free ends with recesses 229 that are defined by the claws 228.

Each projection 227 is a plate portion, which is integrally formed with the annular portion 221, i.e., the main body of the first sub-plate 207. The projections 227 have the same thickness as the annular portion 221. The projections 227 have flat surfaces that are perpendicular to the radial direction of the clutch disk assembly 201.

Figure 34:
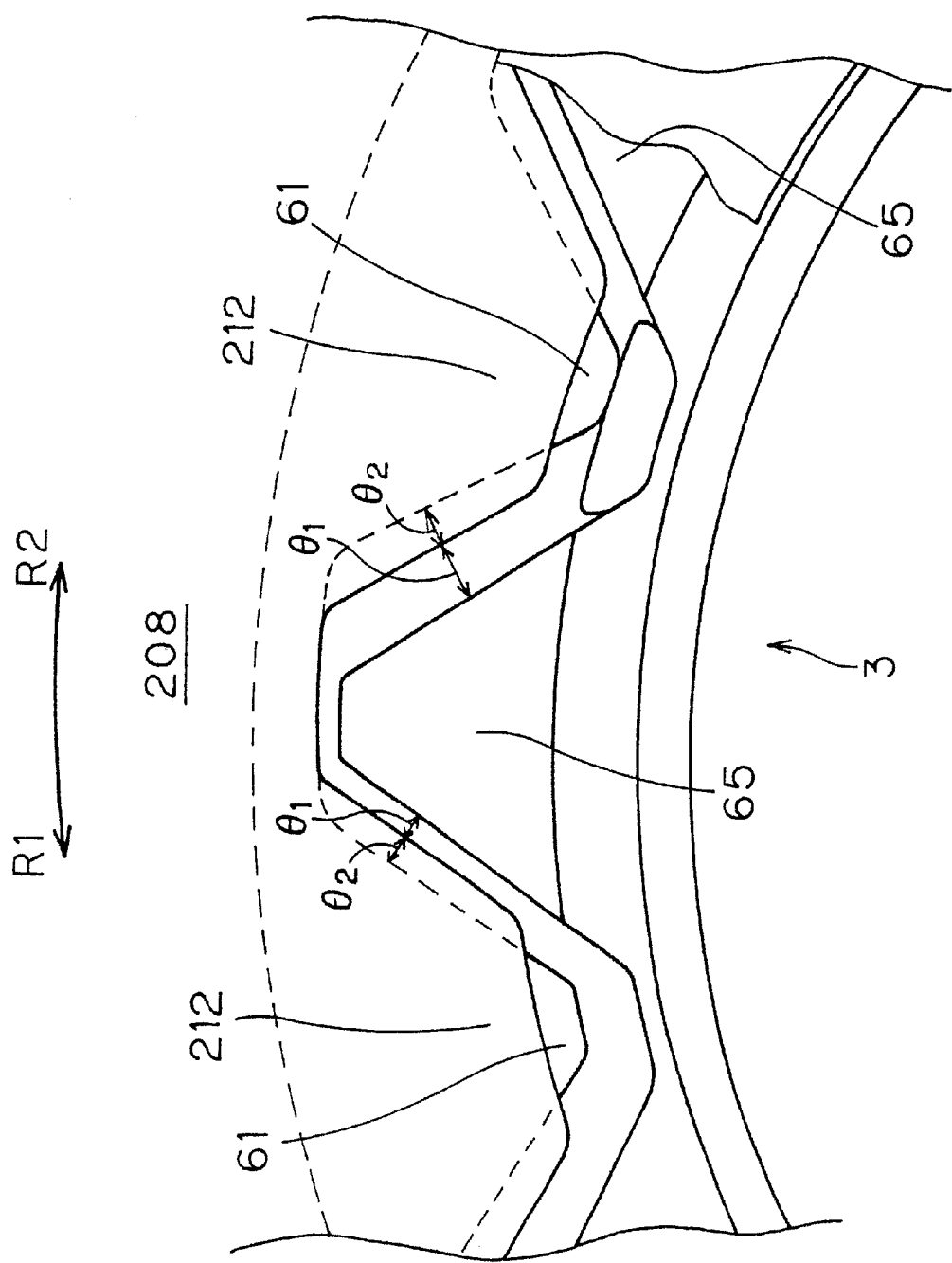
FIG. 34 is a partial side view of second sub plate and hub to show an engagement therebetween.

Now referring to FIGS. 31, 34 and 35, the second sub-plate 208 will be described in more detail. The second sub-plate 208 is a circular or annular member that is disposed between the hub flange 18 and the retaining plate 32. More specifically, the second sub-plate 208 is disposed axially between the hub flange 18 and the fixed plate 20 as seen in FIG. 25. The second sub-plate 208 is made of a circular metal plate in a similar manner to the first sub-plate 207. The second sub-plate 208 has the substantially same outer diameter as the first sub-plate 207, but has an inner diameter smaller than that of the first sub-plate 207. More specifically, the inner peripheral portion of the second sub-plate 208 extends radially inward beyond the first sub-plate 207.

Figure 31:
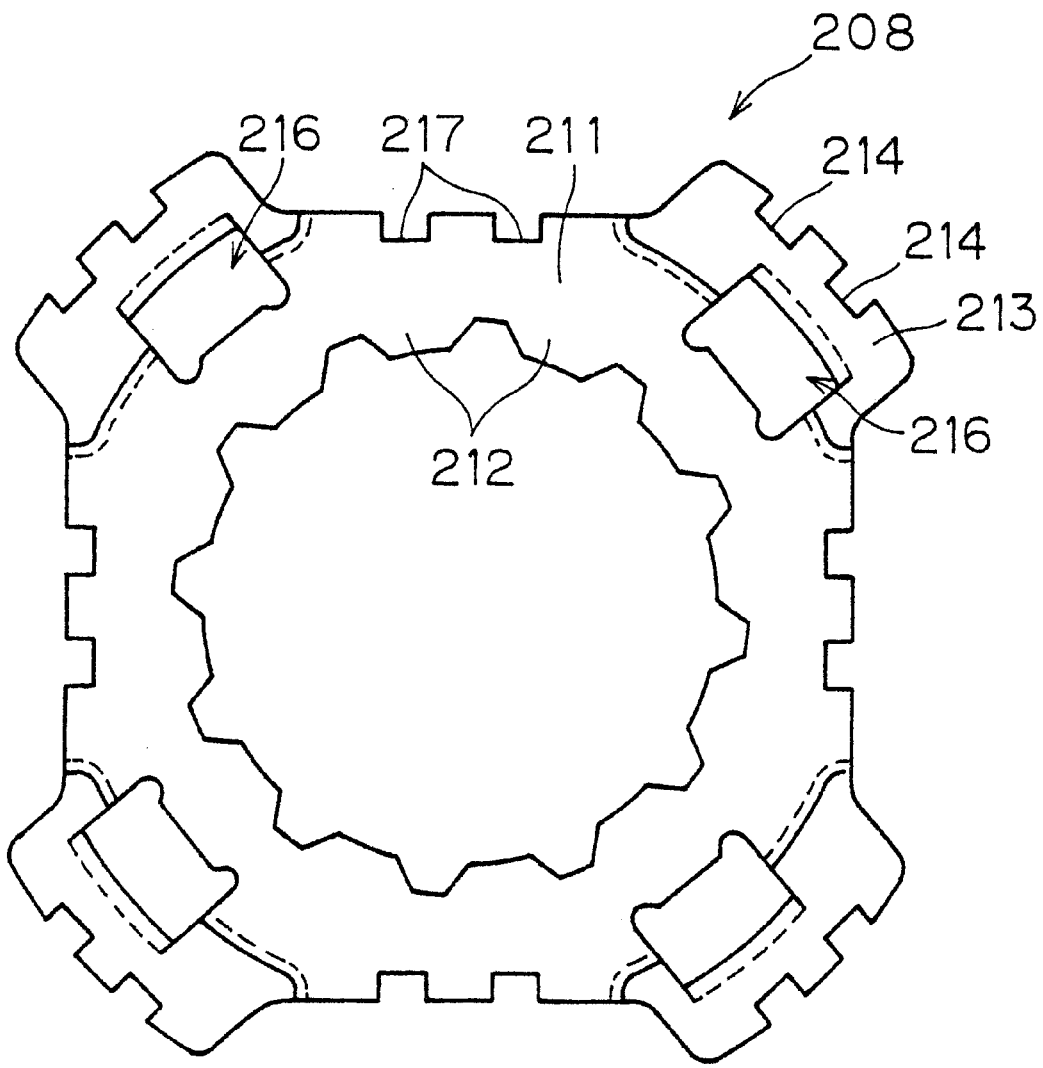
FIG. 31 is a plan view of a second sub plate in accordance with the present invention.

As shown in FIG. 31, the second sub-plate 208 is primarily formed of the annular portion 211. The annular portion 211 is provided at its inner periphery with a plurality of inner teeth 212 that project radially inward. The inner teeth 212 are axially aligned with the inner teeth 61 of hub flange 18, respectively. Each inner tooth 212 is shorter in the circumferential direction than the inner tooth 61, as shown in FIG. 34. Specifically, the circumferentially opposite ends of each inner tooth 212 are located radially outside the circumferentially opposite ends of the inner tooth 61. Each inner tooth 212 is disposed circumferentially between the outer teeth 65 of hub 3, similarly to the inner teeth 61. Each outer tooth 65 is spaced by an angle of $\theta_1$ from each of the inner teeth 212 located on its circumferentially opposite sides. Further, each outer tooth 65 is spaced by an angle of $(\theta_1+\theta_2)$ from each of the end surfaces of the inner teeth 61 located on its circumferentially opposite sides thereof.

The annular portion 211 is also provided with a plurality of projections 213 projected radially outward. The projections 213 are circumferentially equally spaced from each other. The projections 213 are located correspondingly to the third window holes 230 in hub-flange 18, respectively. Windows 216 are formed in the portions corresponding to the projections 213, respectively. Each window 216 has an axial through hole, and supports the circumferentially opposite ends, radially opposite ends and axially one side (transmission side) of one of the springs 206. The projections 213 are provided at their radially outer edges with first engagement portions 214. The first engagement portions 214 are formed by two recesses in each of the projections 213. The first engagement portions 214 engage claws 75 of the fixing plate 20. Thereby, the second sub-plate 208 can rotate together with the fixed plate 20. The claws 75 can radially move a predetermined distance with respect to the first engagement portion 214. The claws 75 are axially movable with respect to the first engagement portion 214.

The annular portion 211 is provided at its outer periphery with second engagement portions 217 each located circumferentially between the projections 213. As a result, the first sub-plates 207 and 208 can rotate together. The claws 228 can radially move a predetermined distance with respect to the second engagement portions 217.

The surface of the annular portion 211 of the second sub-plate 208 on the transmission side is in contact with the fixed plate 20. The fixed plate 20 is pressed toward the engine by the conical spring 49. The second sub-plate 208 is in turn biased by the fixed plate 20 toward the engine by the conical spring 49. The second sub-plate 208 is axially supported on the hub flange 18 by a washer 240, which is disposed between the annular portion 211 and the inner peripheral portion of the hub flange 18 (circular plate member, second intermediate member) as seen in FIGS. 25–27. The washer 240 is made of resin. The washer 240 has an annular portion in contact with the hub flange 18 and a plurality of projections 240a (engagement portions) disposed in the circumferential direction. Each projection 240a extends toward the transmission, and is fitted into a through-hole (not shown in FIG. 31) formed in the annular portion 211 of the second sub-plate 208 as seen in FIG. 27. Owing to this structure, the washer 240 can rotate together with the second sub-plate 208, and can slide on the hub flange 18. In this embodiment, the washer 240 is formed integrally with the second sub-plate 208 by conventional molding techniques.

Since the second sub-plate 208 and the washer 240 are prepared by molding, the number of assembly steps, the number of bonding steps and the cost can be smaller than those in the prior art. Further, the washer 240 is fixed to the holes in the sub-plate 280 so that the strength thereof can be higher than that in a conventional washer made of a single plate. The washer 240 may be fixed in advance to the second sub-plate 208, whereby a lapse and an error in assembly can be prevented.

Referring to FIGS. 30 and 32, the projections 227 of sub-plate 207 extend through recesses 56a formed in the inner periphery of the second window holes 56. Since the portions which are provided for rotating the first and second sub-plates 207 and 208 together extends through the window holes 56 which are already formed, it is not necessary to form an additional apertures and slits. Since each projection 227 forms a space larger than $\theta_2$ with respect to each of the circumferentially opposite ends of the recess 56a.

In this embodiment, first and second sub-plates 207 and 208 are engaged via the plate-like projections 227. This structure can significantly reduce a required space compared with a conventional structure employing sub-pins. In particular, the projection 227 has a plate-like form, and its radial width is equal to the thickness of the plate. Therefore, a sufficient radial space can be ensured. Since the projections 227 occupy small radial spaces in the second window holes 56, reduction in diameters of the first springs 16 can be prevented. Since the projections 227 are disposed at the radially innermost position in the second windows 56, interference with the first springs 16 can be effectively suppressed. Since the projections 227 have a plate-like form, their axial sizes can be much smaller than that of the conventional sub-pin.

Further, the projections 227 are integral with the first sub-plate 207. Therefore, the number of parts can be smaller than that in the conventional structure employing the sub-pins.

The features of the first and second sub-plates 207 and 208 will now be summarized. First, both the plates 207 and 208 are made of sheet metal, and thus allows easy forming. Second, the plates 207 and 208 are non-rotatably connected together by the projections 227. Third, the plate 208 has the inner teeth 212, which form the stop for restricting compression of the springs 21 (first elastic member).

The description of the function of the bushing 93 (radial positioning member) will now be discussed in more detail in relation to this embodiment. The friction bushing 93 is primarily formed of the annular portion 94 made of resin as shown in FIGS. 20 to 22. The annular portion 94 is a circular member having a predetermined radial width and a small axial size or thickness. The annular portion 94 is provided at its inner periphery with the cylindrical portion 98 that projects axially toward the engine (i.e., the first axial size). The inner peripheral surface of the cylindrical portion 98 is in contact with the outer peripheral surface of the boss 62 of the hub 3 as seen in FIGS. 25–27. The annular portion 94 is also provided at its outer periphery with the cylindrical portion 97, which projects axially toward the transmission (i.e., the second axial size). The inner peripheral surface of the cylindrical portion 97 is in contact with the outer peripheral surface of the cylindrical portion 222 of the first sub-plate 207.

The bushing 93 operates as follows. First, the cylindrical portion 98 (first support portion) rotatably and radially supports the bushing 93 itself as well as the clutch plate 31 and the retaining plate 32 with respect to the boss 62 of the hub 3.

Second, the cylindrical portion 97 (second support portion) rotatably and radially supports the hub flange 18 with respect to the boss 62 of the hub 3. The cylindrical portion 97 directly supports the cylindrical portion 59 in the first embodiment, and supports the cylindrical portion 59 through the cylindrical portion 222 of the first sub-plate 207 in the second embodiment. As described above, the bushing 93 centers the three plates (plates 31 and 32, and hub flange 18) disposed around the boss 62 of the hub 3 with respect to the boss 62.

Figure 37:
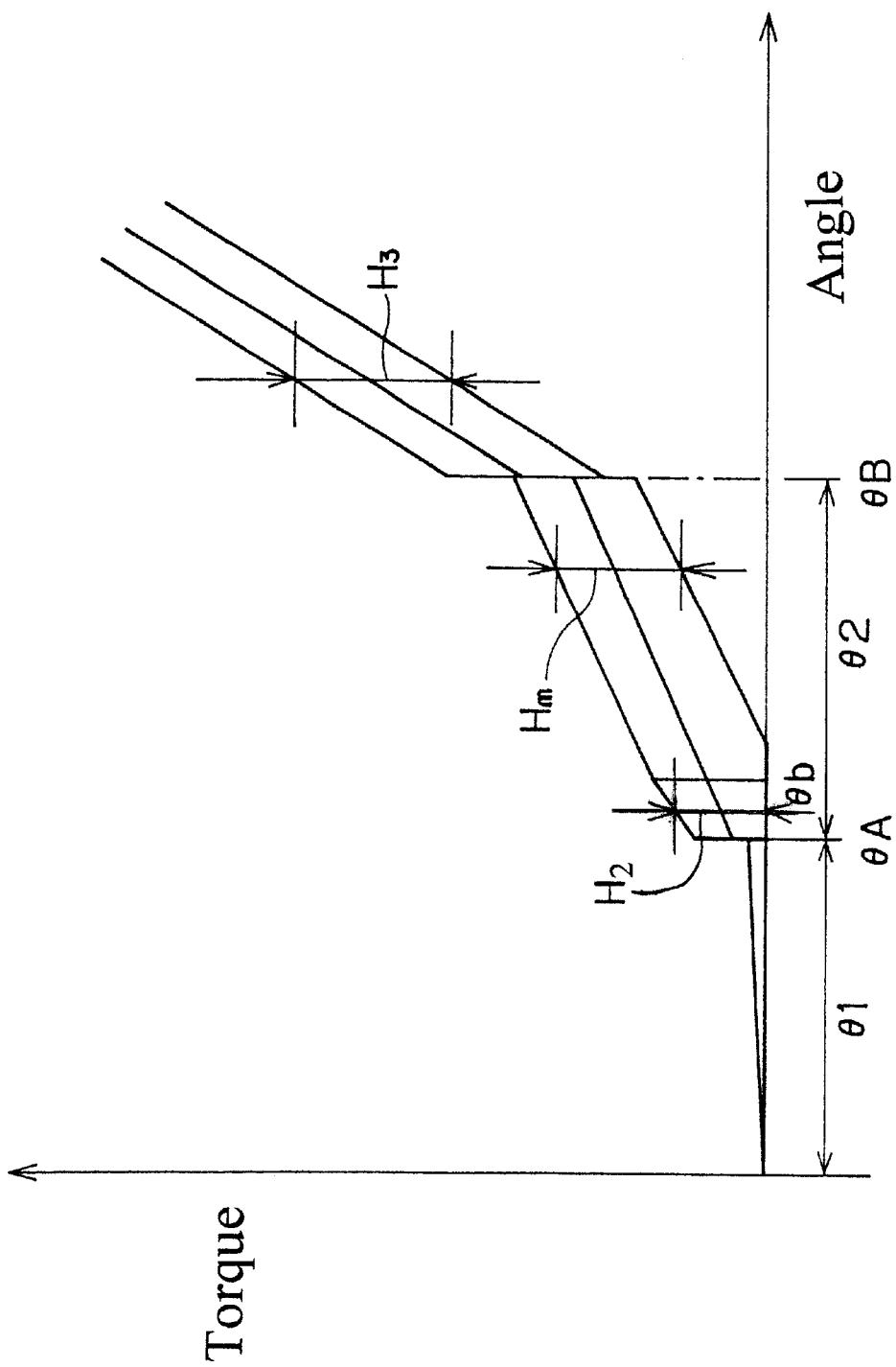
FIG. 37 shows a torsion characteristic curve of the clutch or damper disk assembly in accordance with the present invention.

Referring to a torsion characteristic diagram of FIG. 37, the description of the operation of the clutch disk assembly 201 will now be described. The following description is given on the operation, in which the input rotary member 2 is fixed to another member, and the hub 3 is twisted in one direction (e.g., direction R2) with respect to the input rotary member 2. In a region of a small torsion angle, the springs 21 (first elastic member) having the lowest rigidity are compressed, and sliding occurs in the friction mechanism 10. As a result, the characteristics of a low rigidity and a low hysteresis torque are produced in a range smaller than the first torsion angle of $\theta A$.

When the torsion angle exceeds $\theta A$, the springs 21 are not further compressed, and the springs 206 are now compressed in the rotating direction. In this operation, sliding occurs in the friction mechanism 8, and a hysteresis torque larger than that in the first stage occurs. In this second stage, when the torque generated by the springs 206 exceeds the sum of the initial torque of the first springs 16 and the hysteresis torque (i.e., the torque based on the resistant force which is generated in the frictionally engaged portions (particularly, the friction mechanism 242) when the springs 206 apply the load to the first spring 16), the first springs 16 start to be compressed, and sliding occurs in the friction mechanism 242 disposed in parallel with the first springs 16. In this manner, the hysteresis torque increases at some intermediate point in the second stage. When the torsion angle reaches the second torsion angle of $\theta B$, the inner and outer teeth 61 and 65 come into contact with each other, and the springs 206 are not further compressed. Thus, only the first springs 16 are further compressed. When the torsion angle further increases, the springs 17 are compressed in parallel with the first springs 16.

As described above, the springs 206 and 16 in the second and third stages are disposed for operation in series so that the hysteresis torque increases at some intermediate point in the second stage.

More specifically, in the initial range of the second stage, only the springs 206 are primarily compressed to provide the characteristics of an intermediate rigidity and an intermediate hysteresis torque (H2). The first springs 16 and the springs 206 are compressed in series at and after the intermediate point of $\theta b$ in the second stage so that the characteristics exhibits the rigidity, which is higher than that in the first stage but which is lower than that in the initial range of the second stage. However, the springs 206 are compressed so that sliding occurs between the bushing 93 and the cylindrical portion 59, whereby an intermediate hysteresis torque (Hm) larger than that in the initial range of the second stage is generated. In this embodiment, the range of the intermediate hysteresis torque (Hm) occupies a major part (about 80%) of the second stage. When the torsion angle exceeds the angle θB, the springs 206 are not further compressed, and only the first springs 16 are further compressed. Accordingly, the third stage provides a higher rigidity than the second stage. A high hysteresis torque (H3) generated in the third stage is higher than the hysteresis torques (H2 and Hm) generated in the second stage.

As can be seen from the above description, the intermediate hysteresis torque (Hm) which is caused when the first springs 16 and the springs 206 are compressed in series is higher than the hysteresis torque (H2) which is generated when only the first springs 16 are compressed, and are lower than the high hysteresis torque (H3) which is generated when only the springs 206 are compressed. As a result, it is possible to prevent rapid increase in hysteresis torque at θB, and therefore at the start of the third stage (i.e., boundary between the second and third stages). In the prior art, a large change from H2 to H3 occurs in the hysteresis torque at the angle of θB. Further, according to the embodiment, the hysteresis torque does not rapidly increase at θA, and thus at the start of the second stage (i.e., boundary between the first and second stages).

The foregoing torsion characteristics can effectively suppress the jumping phenomenon due to vibrations, which occur during idling and act entirely on the positive and negative first stages. More specifically, since the intermediate hysteresis torque (Hm) is obtained in the second stage, vibrations can be absorbed slowly.

In the dampening mechanism providing the four-stage characteristics, the second elastic member (springs 206) and the third elastic member (springs 16) are disposed in series. This structure can further achieve the following advantages. In the prior art, a spring corresponding to the spring for the second stage is additionally employed for achieving the fourth-stage characteristics by the clutch disk originally providing the third-stage characteristics. The spring thus employed may be disposed for operation in parallel with the springs for the third and fourth stages. In this case, the addition of the spring for the second stage increases the stop torque. In the case of the parallel arrangement, new setting such as decrease in rigidity of the spring for the third stage is required for providing the stop torque equal to that in the third-stage characteristics. In contrast to this, the mechanism that employs elastic members for the second and third stages disposed in series can provide the stop torque equal to that of the original third-stage characteristics even if the spring for the second stage is additionally employed. This is because the torque generated by the third-stage spring can cancel the torque generated by the second-stage spring owing to the arrangement of the second-stage and third-stage springs in series. As a result, new setting of the spring for the third-stage is not required.

In the foregoing third embodiment, since the elastic member for the second and third stages are likewise disposed in series for achieving the four-stage characteristics, effects similar to those of this embodiment can be achieved.

Other Embodiments

The fitted portions of the first and second sub-plates 207 and 208, i.e., the claws 228 of the projections 227 and the second engagement portions 217 may be firmly fixed by welding, adhesion, caulking or the like. In this case, fretting abrasion is unlikely to occur on the fitted portions. Since a space due to the abrasion of the fitted portions is prevented, delay in operation is unlikely to occur, and the fitted portions can have a long life-time.

The first and second sub-plates 207 and 208 may be coupled together via a plate member(s) independent of these plates 207 and 208. The independent plate member(s) is non-rotatably engaged with or firmly fixed to the plates 207 and 208.

The structure for coupling the first and second sub-plates 207 and 208 in the rotating direction may be formed of projections, which project axially from the first or second sub-plate 207 or 208 and which are engaged with each other. This structure can achieve similar effects.

The sub-plate structure already described has the advantageous structures relating to (1) fitting of the first and second sub-plates 207 and 208 by the projections 227, and (2) integral formation of the second sub-plate 208 and the friction washer 240. These advantageous structure can be employed in structure other than the sub-plate structure, which is used as the input member of the dampening for coupling the hub flange 18 to the boss 3 as is done in the clutch disk assembly of this embodiment. In other words, the advantages of the sub-plate structure according to the invention can be applied to any sub-plate structure in which the sub-plate is disposed beside the circular flange. As another example of the clutch disk assembly which has not been described as the embodiments, the invention may be applied to such a structure that the sub-plate is disposed beside the flange which is integral with the hub. In this structure, the sub-plate functions as an intermediate member coupling the elastic members having high and low rigidities and disposed in the window holes of the flange.

In the above embodiment, the first springs 16 have a higher rigidity than the springs 206, but may have a lower rigidity than the springs 206 if needed and/or desired.

Although the foregoing embodiment relates to the dampening mechanism of the clutch disk assembly having the four-stage characteristics, the invention can be applied to a dampening mechanism that is not provided with the spring for the fourth stage, and therefore has three-stage characteristics. A dampening mechanism employing the invention may have characteristics providing five or more stages.

Although the second springs 21 and the springs 206 are disposed in series in the foregoing embodiments, they may be disposed in parallel. Although the second springs 21 in the foregoing embodiments are compressed only in the first stage, it may be additionally compressed in the second stage.

Effect of the Invention

In the dampening mechanism according to the invention, the second and third elastic members are disposed for operation in series. Therefore, the third and second elastic members operate in series in the rotating direction, and sliding occurs in the friction mechanism when the torque generated by the second elastic member exceeds the sum of the initial torque of the third elastic member and the hysteresis torque of the friction mechanism at some intermediate point during compression of the second elastic member. Thus, the friction mechanism starts to operate in the second stage so that the higher hysteresis torque is generated. As a result, rapid rising of the hysteresis torque is prevented.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper disk assembly, comprising:

a first rotary member;

a second rotary member disposed relatively rotatably with respect to said first rotary member; and a dampening mechanism coupled between said first and second rotary members to transmits a torque therebetween and dampen torsional vibrations, said dampening mechanism including a first elastic member adapted to be elastically deformed in a first stage of torsion characteristics, a second elastic member adapted to be elastically deformed only in a second stage of torsion characteristics for providing a higher rigidity than that in said first stage, a third elastic member disposed so as to operate at least partially in series with respect to said second elastic member in a third stage of torsion characteristics, and a first friction mechanism disposed so as to operate in parallel with respect to said third elastic member, said torsion characteristics of said second stage of said second elastic member being arranged to generate a torque that exceeds a sum of an initial torque of said third elastic member and a hysteresis torque of said first friction mechanism during relative rotation of said first and second rotary members such that said second and third elastic members are elastically compressing together during said second stage.

2. The damper disk assembly as set forth in claim 1, wherein said dampening mechanism includes an intermediate member disposed so as to transmit a torque between said second and third elastic members, said first and second elastic members are disposed so as to transmit the torque between said first rotary member and said intermediate member, said third elastic member is disposed so as to transmit the torque between said intermediate member and said second rotary member, and said first rotary member and said intermediate member are arranged to form a stop therebetween to allow a predetermined amount of rotational movement in a circumferential direction.

3. The damper disk assembly as set forth in claim 1, wherein said third elastic member has a higher rigidity than said second elastic member.

4. The damper disk assembly as set forth in claim 1, wherein said dampening mechanism includes a fourth elastic member disposed so as to operate in parallel with respect to said third elastic member, and configured to operate in a range not exceeding a predetermined torsion angle.

5. The damper disk assembly as set forth in claim 1, wherein said dampening mechanism includes a second friction mechanism disposed so as to operate in parallel with said second elastic member, and configured to generate a smaller friction than said first friction mechanism.

6. The damper disk assembly as set forth in claim 1, wherein said first rotary member includes a hub with an axial bore.

7. The damper disk assembly as set forth in claim 1, wherein said second rotary member includes a clutch plate and a retaining plate coupled together by pins to be axially spaced apart.

8. The damper disk assembly as set forth in claim 2, wherein said dampening mechanism includes a fourth elastic member disposed so as to operate in parallel with respect to said third elastic member, and configured to operate in a range not exceeding a predetermined torsion angle.

9. The damper disk assembly as set forth in claims 8, wherein said dampening mechanism includes a second friction mechanism disposed so as to operate in parallel with said second elastic member, and configured to generate a smaller friction than said first friction mechanism.

10. The damper disk assembly as set forth in claim 9, wherein said dampening mechanism includes a first urging member arranged to axially urge a first axially facing friction surface of said second rotary member against a first axially facing friction surface of said intermediate member to form said first friction mechanism, and to axially urge a second axially facing friction surface of said second rotary member against a second axially facing friction surface of said intermediate member to form said second friction mechanism.

11. The damper disk assembly as set forth in claim 10, wherein said dampening mechanism includes a third friction mechanism formed between said second rotary member and said intermediate member to generate a third friction when said intermediate member rotates relative to said second rotary member during elastic deformation of said second elastic member.

12. A damper disk assembly comprising:

a first rotary member;

a second rotary member disposed relatively rotatably with respect to said first rotary member; and a dampening mechanism coupled between said first and second rotary members to transmit a torque therebetween and dampen torsional vibrations, said dampening mechanism including a first elastic member adapted to be elastically deformed in a first stage of torsion characteristics, a second elastic member adapted to be elastically deformed only in a second stage of torsion characteristics for providing a higher rigidity than that in said first stage, a third elastic member disposed so as to operate at least partially in series with respect to said second elastic member in a third stage of torsion characteristics, a fourth elastic member disposed so as to operate in parallel with respect to said third elastic member, and configured to operate in a range not exceeding a predetermined torsion angle, a first friction mechanism disposed so as to operate in parallel with respect to said third elastic member, with said torsion characteristics of said second stage of said second elastic member being adapted to generate a torque that exceeds a sum of an initial torque of said third elastic member and a hysteresis torque of said first friction mechanism during relative rotation of said first and second rotary members, a second friction mechanism disposed so as to operate in parallel with said second elastic member, and configured to generate a smaller friction than said first friction mechanism, a third friction mechanism being formed between said second rotary member and said intermediate member to generate a third friction when said intermediate member rotates relative to said second rotary member during elastic deformation of said second elastic member, an intermediate member disposed so as to transmit a torque between said second and third elastic members, said first and second elastic members being disposed so as to transmit the torque between said first rotary member and said intermediate member, said third elastic member being disposed so as to transmit the torque between said intermediate member and said second rotary member, said first rotary member and said intermediate member being arranged to form a stop therebetween to allow a predetermined amount of rotational movement in a circumferential direction, and a first urging member arranged to urge axially a first axially facing friction surface of said second rotary member against a first axially facing friction surface of said intermediate member to form said first friction mechanism, and to urge axially a second axially facing friction surface of said second rotary member against a second axially facing friction surface of said intermediate member to form said second friction mechanism, said first urging member being arranged to urge axially said second rotary member and said intermediate member together to generate said third friction when said intermediate member rotates relative to said second rotary member during elastic deformation of said second elastic member.

13. The damper disk assembly as set forth in claim 12, wherein said dampening mechanism includes a fourth friction mechanism formed between said first rotary member and said intermediate member with a second urging member arranged to axially urge an axially facing friction surface of said first rotary member against an axially facing friction surface of said intermediate member to generate a fourth friction when said first rotary member rotates relative to said intermediate member during elastic deformation of said first elastic member.

14. The damper disk assembly as set forth in claim 2, wherein said first rotary member includes an output hub with a set of first teeth, and said intermediate member includes a fixing plate and a sub-plate, said fixing plate has a set of second teeth that operatively engages said first teeth after a predetermined amount of relative rotation between said output hub and said fixing plate, and said sub-plate has a set of third teeth that operatively engages said first teeth after a predetermined amount of relative rotation between said output hub and said sub-plate.

15. The damper disk assembly as set forth in claim 14, wherein said second rotary member includes a clutch plate and a retaining plate coupled together by at least one pin that engages a portion of said fixing plate to limit rotational movement between said first and second rotary members.

16. A damper disk assembly comprising:

a first rotary member including an output hub with a set of first teeth;

a second rotary member disposed relatively rotatably with respect to said first rotary member, said second rotary member including a clutch plate and a retaining plate coupled together by at least one pin that engages a portion of said fixing plate to limit rotational movement between said first and second rotary members; and a dampening mechanism coupled between said first and second rotary members to transmit a torque therebetween and dampen torsional vibrations, said dampening mechanism including a first elastic member adapted to be elastically deformed in a first stage of torsion characteristics, a second elastic member adapted to be elastically deformed only in a second stage of torsion characteristics for providing a higher rigidity than that in said first stage, a third elastic member disposed so as to operate at least partially in series with respect to said second elastic member in a third stage of torsion characteristics, a first friction mechanism disposed so as to operate in parallel with respect to said third elastic member, with said torsion characteristics of said second stage of said second elastic member being adapted to generate a torque that exceeds a sum of an initial torque of said third elastic member and a hysteresis torque of said first friction mechanism during relative rotation of said first and second rotary members, a second friction mechanism disposed so as to operate in parallel with said second elastic member, and configured to generate a smaller friction than said first friction mechanism, a third friction mechanism formed between said second rotary member and said intermediate member to generate a third friction when said intermediate member rotates relative to said second rotary member during elastic deformation of said second elastic member, a fourth friction mechanism formed between said first rotary member and said intermediate member to generate a fourth friction when said first rotary member rotates relative to said intermediate member during elastic deformation of said first elastic member, and an intermediate member disposed so as to transmit a torque between said second and third elastic members, said intermediate member includes a fixing plate and a sub-plate, said fixing plate has a set of second teeth that operatively engages said first teeth after a predetermined amount of relative rotation between said output hub and said fixing plate, and said sub-plate has a set of third teeth that operatively engages said first teeth after a predetermined amount of relative rotation between said output hub and said sub-plate, said first and second elastic members are disposed so as to transmit the torque between said first rotary member and said intermediate member, said third elastic member is disposed so as to transmit the torque between said intermediate member and said second rotary member, and said first rotary member and said intermediate member are arranged to form a stop therebetween to allow a predetermined amount of rotational movement in a circumferential direction.

17. The damper disk assembly as set forth in claim 16, wherein said dampening mechanism includes a first urging member arranged to axially urge a first axially facing friction surface of said second rotary member against a first axially facing friction surface of said intermediate member to form said first friction mechanism, and to axially urge a second axially facing friction surface of said second rotary member against a second axially facing friction surface of said intermediate member to form said second friction mechanism.

18. The damper disk assembly as set forth in claim 17, wherein said dampening mechanism includes a second urging member arranged to axially urge an axially facing friction surface of said first rotary member against an axially facing friction surface of said intermediate member to generate said fourth friction when said first rotary member rotates relative to said intermediate member during elastic deformation of said first elastic member.

19. The damper disk assembly as set forth in claim 18, wherein said third elastic member has a higher rigidity than said second elastic member.

20. The damper disk assembly as set forth in claim 18, wherein said dampening mechanism includes a fourth elastic member disposed so as to operate in parallel with respect to said third elastic member, and configured to operate in a range not exceeding a predetermined torsion angle.

21. A damper disk assembly, comprising:

a first rotary member;

a second rotary member disposed relatively rotatably with respect to said first rotary member; and a dampening mechanism disposed between said first and second rotary members for transmitting a torque therebetween and damping torsional vibrations, said dampening mechanism including a first intermediate member disposed close to said first rotary member between said first and second rotary members, a first elastic member elastically coupling said first intermediate member and said first rotary member together in a rotating direction and adapted to be compressed in a first stage of torsion characteristics, a second intermediate member disposed close to said second rotary member between said first and second rotary members, a second elastic member elastically coupling said first and second intermediate members together in the rotating direction for providing a higher rigidity than said first elastic member and adapted to be compressed only in a second stage of the torsion characteristics, a third elastic member elastically coupling said second intermediate member and said second rotary member together in the rotating direction, and a first friction mechanism generating a friction when said second intermediate member and said second rotary member rotate relatively to each other, with a torque generated by said second elastic member being adapted to exceed a sum of an initial torque of said third elastic member and a hysteresis torque of said first friction mechanism.

22. The damper disk assembly as set forth in claim 21, wherein said first rotary member and said second intermediate member form a stop mechanism having a predetermined space in a circumferential direction.

23. The damper disk assembly as set forth in claim 22, wherein said second intermediate member and said second rotary member form said first friction mechanism therebetween.

24. The damper disk assembly as set forth in claim 21, wherein said second intermediate member and said second rotary member form said first friction mechanism therebetween.

25. The damper disk assembly as set forth in claim 21, wherein said third elastic member has a higher rigidity than said second elastic member.

26. The damper disk assembly as set forth in claim 21, wherein said dampening mechanism includes a fourth elastic member disposed so as to operate in parallel with respect to said third elastic member, and configured to operate in a range not exceeding a predetermined torsion angle.

27. The damper disk assembly as set forth in claim 21, wherein said dampening mechanism includes a second friction mechanism disposed so as to operate in parallel with said second elastic member, and configured to generate a smaller friction than said first friction mechanism.

28. The damper disk assembly as set forth in claim 21, wherein said first rotary member includes a hub with an axial bore.

29. The damper disk assembly as set forth in claim 21, wherein said second rotary member includes a clutch plate and a retaining plate coupled together by pins to be axially spaced apart.

30. The damper disk assembly as set forth in claim 27, wherein said dampening mechanism includes a first urging member arranged to axially urge a first axially facing friction surface of said second rotary member against a first axially facing friction surface of said second intermediate member to form said first friction mechanism, and to axially urge a second axially facing friction surface of said second rotary member against a second axially facing friction surface of said first intermediate member to form said second friction mechanism.

31. The damper disk assembly as set forth in claim 30, wherein said dampening mechanism includes a third friction mechanism formed between said second rotary member and said first intermediate member to generate a third friction when said first intermediate member rotates relative to said second rotary member during elastic deformation of said second elastic member.

32. The damper disk assembly as set forth in claim 31, wherein said first urging member is arranged to axially urge said second rotary member and said first intermediate member together to generate said third friction when said first intermediate member rotates relative to said second rotary member during elastic deformation of said second elastic member.

33. The damper disk assembly as set forth in claim 32, wherein
said dampening mechanism includes a fourth friction mechanism formed between said first rotary member and said first intermediate member with a second urging member arranged to axially urge an axially facing friction surface of said first rotary member against an axially facing friction surface of said first intermediate member to generate a fourth friction when said first rotary member rotates relative to said first intermediate member during elastic deformation of said first elastic member.

34. The damper disk assembly as set forth in claim 21, wherein
said first rotary member includes an output hub with a set of first teeth,
said second intermediate member includes a set of second teeth that operatively engages said first teeth after a predetermined amount of relative rotation between said output hub and said second intermediate member, and
said first intermediate member has a set of third teeth that operatively engages said first teeth after a predetermined amount of relative rotation between said output hub and said firs t intermediate member.

35. The damper disk assembly as set forth in claim 34, wherein
said second rotary member includes a clutch plate and a retaining plate coupled together by at least one pin that engages a portion of said second intermediate member to limit rotational movement between said first and second rotary members.

36. The damper disk assembly as set forth in claim 35, wherein
said dampening mechanism includes a third friction mechanism formed between said second rotary member and said first intermediate member to generate a third friction when said first intermediate member rotates relative to said second rotary member during elastic deformation of said second elastic member, and
a fourth friction mechanism formed between said first rotary member and said first intermediate member to generate a fourth friction when said first rotary member rotates relative to said first intermediate member during elastic deformation of said first elastic member.

37. The damper disk assembly as set forth in claim 36, wherein
said dampening mechanism includes a first urging member arranged to axially urge a first axially facing friction surface of said second rotary member against a first axially facing friction surface of said second intermediate member to form said first friction mechanism, and to axially urge a second axially facing friction surface of said second rotary member against a second axially facing friction surface of said first intermediate member to form said second friction mechanism.

38. The damper disk assembly as set forth in claim 37, wherein
said dampening mechanism includes a second urging member arranged to axially urge an axially facing friction surface of said first rotary member against an axially facing friction surface of said first intermediate member to generate said fourth friction when said first rotary member rotates relative to said first intermediate member during elastic deformation of said first elastic member.

39. The damper disk assembly as set forth in claim 38, wherein
said third elastic member has a higher rigidity than said second elastic member.

40. The damper disk assembly as set forth in claim 38, wherein
said dampening mechanism includes a fourth elastic member disposed so as to operate in parallel with respect to said third elastic member, and configured to operate in a range not exceeding a predetermined torsion angle.

* * * * *